(12) United States Patent
Al Faruque et al.

(10) Patent No.: US 12,406,583 B2
(45) Date of Patent: Sep. 2, 2025

(54) METHODS FOR SPATIO-TEMPORAL SCENE-GRAPH EMBEDDING FOR AUTONOMOUS VEHICLE APPLICATIONS

(71) Applicant: THE REGENTS OF THE UNIVERSITY OF CALIFORNIA, Oakland, CA (US)

(72) Inventors: Mohammad Abdullah Al Faruque, Irvine, CA (US); Shih-Yuan Yu, Irvine, CA (US); Arnav Vaibhav Malawade, Irvine, CA (US); Deepan Muthirayan, Irvine, CA (US); Pramod P. Khargonekar, Irvine, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 220 days.

(21) Appl. No.: 18/154,987

(22) Filed: Jan. 16, 2023

(65) Prior Publication Data
US 2023/0230484 A1     Jul. 20, 2023

Related U.S. Application Data

(60) Provisional application No. 63/300,386, filed on Jan. 18, 2022.

(51) Int. Cl.
*G08G 1/16* (2006.01)
*B60W 30/095* (2012.01)
*B60W 60/00* (2020.01)

(52) U.S. Cl.
CPC ......... *G08G 1/166* (2013.01); *B60W 30/0956* (2013.01); *B60W 60/0015* (2020.02);
(Continued)

(58) Field of Classification Search
CPC ... G08G 1/166; G08G 1/167; B60W 30/0956; B60W 60/0015; B60W 2420/403;
(Continued)

(56) References Cited

U.S. PATENT DOCUMENTS

| 11,235,785 B2 * | 2/2022 | Pazhayampallil .... G01S 17/931 |
| 11,610,423 B2 * | 3/2023 | Mao ........................ G06T 7/246 |
| 2022/0126445 A1 * | 4/2022 | Zhu ......................... B25J 9/1635 |

OTHER PUBLICATIONS

Bao, Wentao and Yu, Qi and Kong, Yu, "Uncertainty-based Traffic Accident Anticipation with Spatio-Temporal Relational Learning" 2020, 9781450379885, Association for Computing Machinery, https://doi.org/10.1145/3394171.3413827, 10.1145/3394171.3413827 (Year: 2020).*

(Continued)

*Primary Examiner* — Brian P Sweeney
(74) *Attorney, Agent, or Firm* — NGUYEN TARBET IP LAW

(57) ABSTRACT

The present invention is directed to a Spatiotemporal scene-graph embedding methodology that models scene-graphs and resolves safety-focused tasks for autonomous vehicles. The present invention features a computing system comprising instructions for accepting the one or more images, extracting one or more objects from each image, computing an inverse-perspective mapping transformation of the image to generate a bird's-eye view (BEV) representation of each image, calculating relations between each object for each image, and generating a scene-graph for each image based on the aforementioned calculations. The system may further comprise instructions for calculating a confidence value for whether or not a collision will occur through the generation of a spatio-temporal graph embedding based on a spatial graph embedding and a temporal model.

20 Claims, 19 Drawing Sheets

(52) U.S. Cl.
CPC ....... *G08G 1/167* (2013.01); *B60W 2420/403* (2013.01); *B60W 2552/00* (2020.02); *B60W 2554/402* (2020.02); *B60W 2554/4041* (2020.02)

(58) Field of Classification Search
CPC ....... B60W 2552/00; B60W 2554/402; B60W 2554/4041; G06V 10/82; G06V 20/56; G06V 20/70; G06N 3/048; G06N 3/096; G06N 3/0442; G06N 3/045; G06N 3/0464; G06N 3/084; G06N 3/09
See application file for complete search history.

(56) References Cited

OTHER PUBLICATIONS

Yu et al. "Scene-graph augmented data-driven risk assessment of autonomous vehicle decisions." IEEE Transactions on Intelligent Transportation Systems 23.7 (2021): 7941-7951.

Malawade et al. "Roadscene2vec: A tool for extracting and embedding road scene-graphs." Knowledge-Based Systems 242 (2022): 108245.

Malawade et al. "Spatiotemporal scene-graph embedding for autonomous vehicle collision prediction." IEEE Internet of Things Journal 9.12 (2022): 9379-9388.

\* cited by examiner

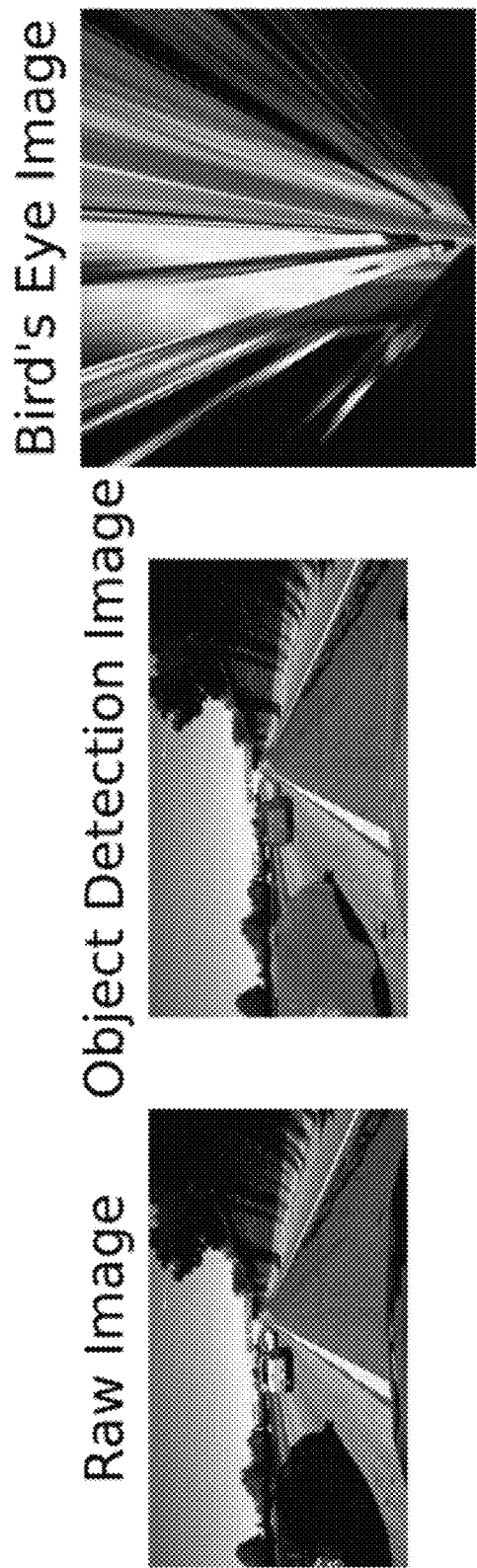
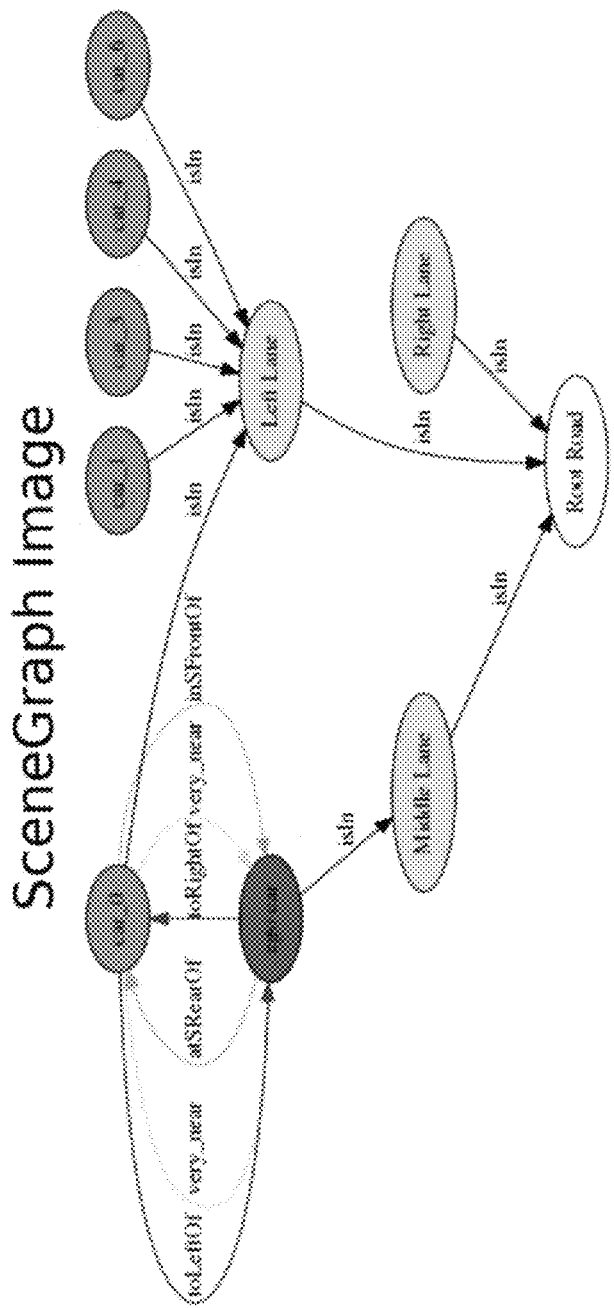
FIG. 8

| Parameter | Description |
|---|---|
| actor_names | The list of object types. The default list is based on the actor types defined by the CARLA simulator. |
| relation_names | The list of all implemented relation types. |
| car_names / moto_names / bicycle_names / etc. | Object names defined in the CARLA simulator. These lists are used to cross-reference the object type for a given CARLA vehicle name. |
| directional_thresholds | Defines the set of enabled directional relations and their thresholds in degrees. |
| directional_relation_list | Defines the pairs of object types for which directional relations will be extracted. |
| proximity_thresholds | Defines the set of enabled distance relations and their thresholds in feet. |
| proximity_relation_list | Defines the pairs of object types for which proximity relations will be extracted. |
| lane_threshold | Represents 50% of the width of a lane in feet. If an object is more than this distance from the ego car's center, it is considered to be in the left or right lane. |

FIG. 10

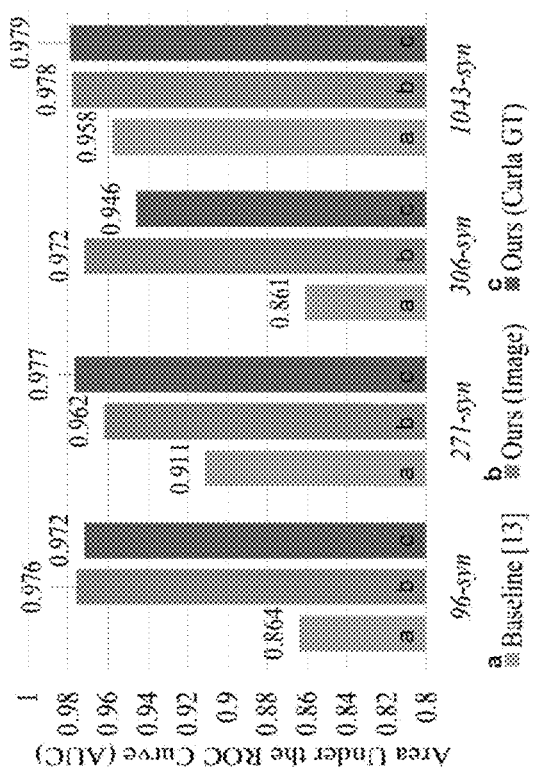
FIG. 13A
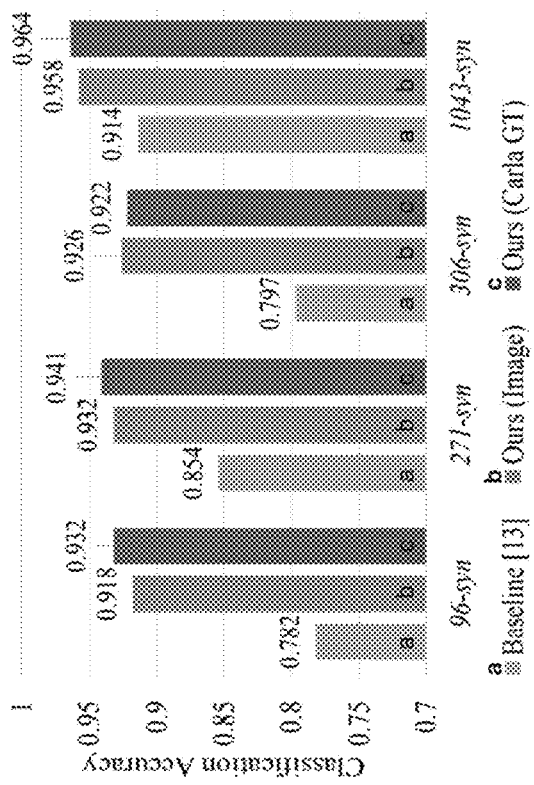
FIG. 13B
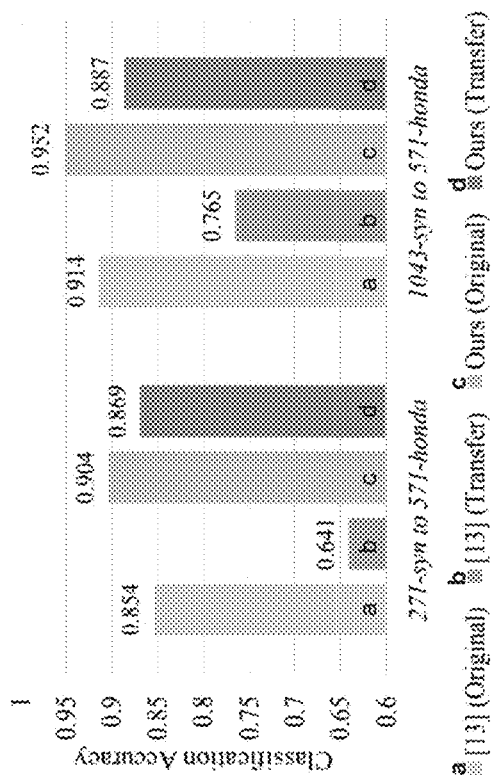
FIG. 13D
| Ablation Study | Spatial Modeling | Temporal Modeling | Avg. Acc. | Avg. AUC |
|---|---|---|---|---|
| | No MR-GCN | mean | 0.762 | 0.823 |
| | No MR-GCN | LSTM-last | 0.867 | 0.929 |
| | 1 MR-GCN | mean | 0.910 | 0.960 |
| | 1 MR-GCN | LSTM-last | 0.943 | 0.977 |
| Temporal Attention | No MR-GCN | LSTM-attn | 0.867 | 0.929 |
| | No MR-GCN | LSTM-attn | 0.868 | 0.938 |
| | 1 MR-GCN | LSTM-attn | 0.943 | 0.977 |
| | 1 MR-GCN | LSTM-attn | 0.950 | 0.977 |
| Spatial Attention | 1 MR-GCN | mean | 0.910 | 0.960 |
| | 1 MR-GCN TopKPool | mean | 0.886 | 0.930 |
| | 1 MR-GCN SAGPool | mean | 0.937 | 0.968 |
FIG. 13C

| Dataset | Model | Accuracy | AUC | MCC |
|---|---|---|---|---|
| 271-syn | SG2VEC (5-frames) | 0.8979 | 0.9541 | 0.5362 |
| 271-syn | SG2VEC | 0.8812 | 0.9457 | 0.5145 |
| 271-syn | DPM | 0.8733 | 0.8939 | 0.2160 |
| 306-syn | SG2VEC (5-frames) | 0.7946 | 0.8653 | 0.5790 |
| 306-syn | SG2VEC | 0.8372 | 0.9091 | 0.6812 |
| 306-syn | DPM | 0.6846 | 0.6881 | 0.3677 |
| 1043-syn | SG2VEC (5-frames) | 0.9142 | 0.9623 | 0.5323 |
| 1043-syn | SG2VEC | 0.9095 | 0.9477 | 0.5385 |
| 1043-syn | DPM | 0.8834 | 0.9175 | 0.2912 |
| 620-dash | SG2VEC (5-frames) | 0.6534 | 0.7113 | 0.3053 |
| 620-dash | SG2VEC | 0.7007 | 0.7857 | 0.4017 |
| 620-dash | DPM | 0.4890 | 0.4717 | -0.0366 |

FIG. 15A

| Dataset | Model | ATP | Avg. Seq. Len. | Ratio |
|---|---|---|---|---|
| 271-syn | SG2VEC (Ours) | 10.004 | 33.920 | 0.2949 |
| 271-syn | DPM | 17.399 | 32.899 | 0.5289 |
| 1043-syn | SG2VEC (Ours) | 6.442 | 37.343 | 0.1725 |
| 1043-syn | DPM | 9.018 | 37.856 | 0.2382 |

FIG. 15B

| Experiment | Spatial Model | Graph Pooling | Temporal Model | Acc. | MCC |
|---|---|---|---|---|---|
| Ablation Study | MLP | none | none | 0.7605 | 0.2612 |
| Ablation Study | MLP | none | LSTM | 0.7660 | 0.2874 |
| Ablation Study | MRGCN | none | none | 0.8605 | 0.4792 |
| Ablation Study | MRGCN | none | LSTM | 0.8931 | 0.5561 |
| Graph Attn. and Pooling | MRGCN | Top-K | none | 0.8288 | 0.3458 |
| Graph Attn. and Pooling | MRGCN | SAGPool | none | 0.8738 | 0.5032 |
| Graph Attn. and Pooling | MRGCN | Top-K | LSTM | 0.9014 | 0.5565 |
| Graph Attn. and Pooling | MRGCN | SAGPool | LSTM | 0.9076 | 0.5407 |

FIG. 15C

| Metric | Dataset | MRGCN | MRGIN | ResNet-50 | CNN+LSTM [48] |
|---|---|---|---|---|---|
| Accuracy | 271-syn | 0.9820 | 0.8501 | 0.6938 | 0.8033 |
| | 1043-syn | 0.9580 | 0.8784 | 0.9053 | 0.7742 |
| | 571-honda | 0.8710 | 0.8310 | 0.7089 | 0.6041 |
| | 1301-honda | 0.8655 | 0.7245 | 0.6839 | 0.7158 |
| AUC | 271-syn | 0.9620 | 0.9437 | 0.7371 | 0.8394 |
| | 1043-syn | 0.9780 | 0.9591 | 0.9616 | 0.8221 |
| | 571-honda | 0.9105 | 0.8903 | 0.8343 | 0.6670 |
| | 1301-honda | 0.9124 | 0.8164 | 0.7340 | 0.7560 |

FIG. 16A

| Metric | Dataset | MRGCN | MRGIN | ResNet-50 | CNN+LSTM [48] |
|---|---|---|---|---|---|
| Accuracy | 271-syn | 0.8812 | 0.8028 | 0.7039 | 0.7184 |
| | 1043-syn | 0.9095 | 0.7803 | 0.8080 | 0.8020 |
| | 571-honda | 0.6922 | 0.7230 | 0.7340 | 0.5006 |
| AUC | 271-syn | 0.9457 | 0.8724 | 0.7364 | 0.7607 |
| | 1043-syn | 0.9477 | 0.8826 | 0.9026 | 0.8493 |
| | 571-honda | 0.7775 | 0.7844 | 0.7802 | 0.5871 |
| MCC | 271-syn | 0.5145 | 0.3046 | 0.3320 | 0.1474 |
| | 1043-syn | 0.5385 | 0.2852 | 0.4002 | 0.2436 |
| | 571-honda | 0.2142 | 0.1008 | 0.3547 | 0.1347 |

FIG. 16B

| Experiment | Model | Original Acc. | Transfer Acc. |
|---|---|---|---|
| 271-syn to 571-honda | ResNet-50 | 0.7030 | 0.1899 (-0.514) |
| | CNN+LSTM [48] | 0.8033 | 0.5244 (-0.279) |
| | MRGCN | 0.9040 | 0.8690 (-0.035) |
| 1043-syn to 571-honda | ResNet-50 | 0.8080 | 0.1725 (-0.638) |
| | CNN+LSTM [48] | 0.7742 | 0.6010 (-0.173) |
| | MRGCN | 0.9520 | 0.8870 (-0.065) |

FIG. 16C

METHODS FOR SPATIO-TEMPORAL SCENE-GRAPH EMBEDDING FOR AUTONOMOUS VEHICLE APPLICATIONS

CROSS-REFERENCES TO RELATED APPLICATIONS

This application is a non-provisional and claims benefit of U.S. Provisional Application No. 63/300,386 filed Jan. 18, 2022, the specification of which is incorporated herein in its entirety by reference.

STATEMENT REGARDING FEDERALLY SPONSORED RESEARCH OR DEVELOPMENT

This invention was made with government support under Grant No. CMMI-1739503 awarded by NSF, Grant No. ECCS-1839429 awarded by NSF, and Grant No, P200A180052 awarded by the Department of Education. The government has certain rights in the invention.

FIELD OF THE INVENTION

The present invention is directed to a spatiotemporal scene-graph embedding methodology that models scene-graphs and resolves safety-focused tasks for autonomous vehicles.

BACKGROUND OF THE INVENTION

Autonomous Vehicles (AVs) are expected to revolutionize personal mobility, logistics, and road safety. However, recent accidents involving Tesla Autopilot and Uber's self-driving cars indicate that the development of safe and robust AVs remains a difficult challenge. Current statistics indicate that perception and prediction errors were factors in over 40% of driver-related crashes between conventional vehicles, leading both researchers and industry leaders to race to address these problems via advanced AV perception systems. Until recently, most AV perception architectures relied entirely on deep learning techniques, centered around Convolutional Neural Networks (CNNs) and Multi-Layer Perceptrons (MLPs), or model-based methods, which use known road geometry information and vehicle trajectory models to estimate the state of the road scene. Although these approaches have been successful in typical use cases, they are limited in their ability to obtain a higher-level human-like understanding of complex road scenarios as they cannot explicitly capture inter-object relationships or the overall structure of the road scene.

Research has suggested that humans rely on cognitive mechanisms for identifying the structure of a scene and reasoning about inter-object relations when performing complex tasks and identifying risk. As such, capturing and identifying the complex relationships between road objects is key in designing an effective human-like AV perception system. To address the limitations of these existing AV perception methods, several groups have proposed using a variant of knowledge graphs known as scene-graphs to model the state of the road and capture the relationships between objects. A scene-graph representation encodes rich semantic information of an image or observed scene, essentially bringing an abstraction of objects and their complex relationships as illustrated in FIG. 3. Each of these related works proposes a different form of scene-graph representation, but all demonstrated significant performance improvements over conventional perception methods. Prior systems propose a 3D-aware egocentric spatio-temporal interaction framework that uses both an Ego-Thing graph and an Ego-Stuff graph, which encodes how the ego vehicle interacts with both moving and stationary objects in a scene, respectively. Other prior systems propose a pipeline using a multi-relational graph convolutional network (MR-GCN) for classifying the driving behaviors of traffic participants. The MR-GCN is constructed by combining spatial and temporal information, including relational information between moving objects and landmark objects. Prior arts have demonstrated that a spatia-temporal scene-graph embedding can be used to identify the subjective risk of driving maneuvers significantly more effectively than the state-of-the-art deep learning method. In addition, the method is able to better transfer knowledge and is more explainable.

Although a wide range of scene-graph based AV perception approaches have been proposed, each method was developed from scratch, requiring significant time and resource investment by each research group. Although tools exist to perform preprocessing and graph learning (e.g., Pytorch™ and Pytorch™ Geometric), there exists no tool for systematically converting road scenes into scene-graphs in this field. As a result, each research group must start developing their scene-graph construction methodology from the ground up, wasting time and effort that could be better spent using the resultant scene-graph representations to solve more complex research problems.

In prior research, the problem of risk assessment for autonomous driving has been tackled by modeling either the objective risk or the subjective risk. The objective risk is defined as the objective probability of an accident occurring and is usually determined by statistical analysis. Some works have focused on minimizing the objective risk by modeling the trajectories of vehicles to guarantee safe driving. Subjective risk refers to the driver's own perceived risk and is an output of the driver's cognitive process. Studies suggest that modeling the subjective risk can be a better option as drivers typically avoid taking a risky driving action based on their subjective perception.

Several papers have leveraged state-of-the-art deep learning architectures for modeling subjective risk. Such methods typically apply Convolutional Neural Networks (CNNs) and Long-Short Term Memory Networks (LSTMs) and have been proven to be effective at capturing features essential for modeling subjective risk in both spatial and temporal domains. However, it is unclear whether these methods can capture critical higher-level information, such as the relationships between the traffic participants in a given scene. Failure in capturing these relationships can result in poor ADS performance in complex scenarios. Also, training these networks requires large datasets covering a wide range of "corner cases" (especially risky driving scenarios), which are expensive and time-consuming to generate. Many researchers resort to using synthesized datasets containing many examples of these corner cases to address this issue. However, for these to be valuable, a model must be able to transfer the knowledge gained from simulated training data to real-world situations. A standard method for measuring a model's ability to generalize is transferability, where a model's accuracy on a dataset different from the training dataset is evaluated. If a model can transfer the knowledge gained from a simulated training set to a real-world testing set effectively, it is likely that it will perform better in unseen real-world scenarios.

Even if these existing methods can transfer knowledge well, the predictions of such methods lack explainability, which is crucial for establishing trust between ADSs and human drivers. Explainability refers to the ability of a model to effectively communicate the factors that influenced its decision-making process for a given input, particularly those that might lead the model to make incorrect decisions. If a model can give attention to the aspects or entities in a traffic scene that make the scenario risky or non-risky, it can improve its decision and its decisions become more explainable.

Two other common design approaches for AV systems are (i) end-to-end deep learning architectures and (ii) modular architectures. Modular approaches are implemented as a pipeline of separate components for performing each sub-task of the AV (e.g., perception, localization, planning, control), while end-to-end approaches generate actuator outputs (e.g., steering, brake, accelerator) directly from their sensory inputs. One advantage of a modular design approach is the division of a task into an easier-to-solve set of sub-tasks that have been addressed in other fields such as robotics, computer vision, and vehicle dynamics, from which prior knowledge can be leveraged. However, one disadvantage of such an approach is the complexity of implementing, running, and validating the complete pipeline. End-to-end approaches can achieve good performance with a smaller network size and lower implementation costs because they perform feature extraction from sensor inputs implicitly through the network's hidden layers. However, the needed level of supervision is too weak for the end-to-end model to learn critical control information (e.g., from image to steering angle), so it can fail to handle complicated driving maneuvers or be insufficiently robust to disturbances.

A third approach called the direct perception approach was first proposed by DeepDriving. In this approach, a set of affordance indicators, such as the distance to lane markings and other cars in the current and adjacent lanes, are extracted from an image and serve as an intermediate representation (IR) for generating the final control output. They show that the use of this IR is effective for simple driving tasks such as lane following as well as enabling better generalization to real-world environments. Similarly, uses a collection of filtered images as the IR. They state that the IR used in their approach allows the training to be conducted on either real or simulated data, facilitating testing and validation in simulations before testing on a real car. Moreover, they show that it is easier to synthesize perturbations to the driving trajectory in the IR than at the raw sensor inputs themselves, enabling them to produce non-expert behaviors such as off-road driving and collisions.

For the past several years, automotive manufacturers have begun equipping consumer vehicles with statistics-based collision avoidance systems based on calculated Single Behavior Threat Metrics (SBTMs) such as Time to Collision (TTC), Time to React (TTR), etc. However, these methods lack robustness since they make significant assumptions about the behavior of vehicles on the road. A very limiting assumption they make is that vehicles do not diverge from their current trajectories. SBTMs can also fail in specific scenarios. For example, TTC can fail when following a vehicle at the same velocity within a very short distance. As a result, these methods are less capable of generalizing and can perform poorly in complex road scenarios. Moreover, to reduce false positives, these systems are designed to respond at the last possible moment. Under such circumstances, the AV control system can fail to take timely corrective actions if the system fails to predict a collision or estimates the TTC, inaccurately.

More effective collision prediction methods using Deep Learning (DL) have also been proposed in the literature. However, these approaches can be limited because they do not explicitly capture the relationships between the objects in a traffic scene. Understanding these relationships could be critical as it is suggested that a human's ability to understand complex scenarios and identify potential risks relies on cognitive mechanisms for representing structure and reasoning about inter-object relationships. These models also require large datasets that are often costly or unsafe to generate. Synthetic datasets are typically used to augment the limited real-world data to train the models in such cases. However, these trained models must then be able to transfer the knowledge gained from synthetic datasets to real-world driving scenarios. Furthermore, DL models contain millions of parameters and require IoT edge devices with significant computational power and memory to run efficiently. Likewise, hosting these models on the cloud is infeasible because it requires persistent low-latency internet connections.

In the literature, several works have applied graph-based formulations for driving scene understanding. Prior systems propose a 3D-aware egocentric spatio-temporal interaction framework that uses both an Ego-Thing graph and an Ego-Stuff graph, which encodes how the ego vehicle interacts with both moving and stationary objects in a scene, respectively. Other prior systems propose a pipeline using a multi-relational graph convolutional network (MR-GCN) for classifying the driving behaviors of traffic participants. The MR-GCN is constructed by combining spatial and temporal information, including relational information between moving objects and landmark objects. Other prior systems propose extracting road scene graphs in a manner that includes pose information for the purpose of scene layout reconstruction. Other prior systems propose using a probabilistic graph approach for explainable traffic collision inference.

Other libraries for extracting scene-graphs from input images have been proposed. the Graph R-CNN model, which extracts scene graphs by identifying the set of individual objects in the image before identifying the spatial relations between the objects. With this process, Graph R-CNN is able to extract the spatial features of the scene in the form of a scene-graph. Prior systems provide a benchmark for evaluating several kinds of scene-graph generation models on image datasets. The scene-graph representations extracted by these tools are then used for semantic understanding and labeling tasks, such as image captioning and visual question answering. Although these tools and models are successful at these tasks, they do not incorporate specific domain knowledge relevant to the AV problem space. Autonomous driving is a highly complex problem on its own so AV algorithms must utilize domain knowledge including driving rules, road layout, and markings, as well as light and sign information. Furthermore, AV algorithms must account for temporal factors; the aforementioned tools operate on individual images and thus do not account for these safety-critical temporal factors.

Regarding graph learning tools and libraries, several tools such as Graph-GYM, LGL, and OGB exist for quickly and easily evaluating several graph learning models on problems including node/graph classification and regression. However, none of these pre-existing tools enable scene-graph generation; they can only be used with existing graph data. The present invention is the only tool that enables both the extraction and learning of AV-specific scene-graphs.

Several works have studied subjective risk assessment for autonomous driving systems. Hidden Markov Models (HMMs) and Language Models are used to detect unsafe lane change events. The approach taken is the most related to the present invention as it infers the risk level of overall driving scenes with a deep Spatio-temporal neural network architecture. By using Mask-RCNN to generate an IR for each image, their approach achieves a 3% performance gain in risk assessment. They show that the architecture with Semantic Mask Transfer (SMT)+CNN+LSTM can perform 25% better than the architecture with Feature Transfer (FT) Frame-by-Frame (FbF), indicating that capturing the spatial and temporal features just from a monocular camera can be useful in modeling subjective risk. However, this approach only considers the spatial features (the latent vector output of the CNN layers) of a frame instead of the relations between all the traffic participants. The present invention uses scene-graphs as IRs to capture the high-level relationships between all the traffic participants of a scene. One of the key contributions is showing that a graph-based intermediate representation can be very effective and efficient for higher-level AV tasks directly related to driving decisions.

Several works have proposed graph-based methods for scene understanding. For example, prior systems have proposed a multi-relational graph convolutional network (MR-GCN) that uses both spatial and temporal information to classify vehicle driving behavior. Similarly, an Ego-Thing and Ego-Stuff graph have been used to model and classify the ego vehicle's interactions with moving and stationary objects, respectively. In prior work, such as "Scene-Graph Augmented Data-Driven Risk Assessment of Autonomous Vehicle Decisions" published Aug. 31, 2020, it was demonstrated that a scene-graph sequence embedding approach assesses driving risk better than the state-of-the-art CNN-LSTM approach. The publication utilized an architecture consisting of MR-GCN layers for spatial modeling and an LSTM with attention for temporal modeling; however, this architecture was only capable of performing binary sequence-level classification over a complete video clip. Thus, although this prior architecture could accurately assess the subjective risk of complete driving sequences, it was not capable of predicting the future state of a scene.

BRIEF SUMMARY OF THE INVENTION

It is an objective of the present invention to provide systems and methods that allow for Spatiotemporal scene-graph embedding to model scene-graphs and resolve safety-focused tasks for autonomous vehicles, as specified in the independent claims. Embodiments of the invention are given in the dependent claims. Embodiments of the present invention can be freely combined with each other if they are not mutually exclusive.

To address the aforementioned problem, the present invention features roadscene2vec: a tool for systematically extracting and embedding road scene-graphs. roadscene2vec enables researchers to quickly and easily extract scene graphs from camera data, evaluate different graph construction methodologies, and use several different graph and machine learning algorithms to generate spatia-temporal graph embeddings for a wide range of AV tasks. roadscene2vec may serve the following use cases: converting image-based datasets as well as datasets generated by the CARLA simulator into scene-graphs; enabling the exploration of different scene-graph construction methodologies for a given application via a flexible, reconfigurable, and user-friendly scene-graph extraction framework; allowing researchers to explore various spatio-temporal graph embedding methods, supporting customized algorithms for further design exploration; providing a set of baselines drawn from state-of-the-art works used for different AV applications (CNN and CNN-LSTM based algorithms); and scene-graph visualization utilities is provided to enhance design space exploration for graph construction.

Camera data is targeted as opposed to lidar, radar, or other sensor types since images are the richest and most detailed modality, providing high-resolution details about the scene as well as color information. This information can be used for better identifying the context of the scene and relations between participants. If other modalities are added, it is unlikely that much more information will be added to the scene graph; only the robustness of the system and precision of the graph will be improved. Besides, current state-of-the-art AV perception architectures utilizing sensor fusion still have shortcomings. Furthermore, the vast majority of publicly available AV datasets primarily contain image data.

The present invention features roadscene2vec: a flexible scene-graph construction and embedding framework that allows researchers to experiment with different graph extraction formulations to find the best one for their problem. The present invention implements an end-to-end graph learning framework for modeling the scene-graph representations. The framework enables automated experimentation and metrics logging over a wide range of graph learning AV applications. The present invention implements templates to facilitate users in defining their own models and problems. The present invention implements many visualization tools and utilities for inspecting and understanding the scene-graphs including attention maps, color-coding by classes or relation type, birds-eye view projection, embedding projection, etc. This enables users to interpret their results easily without having to design their own visualizer. The present invention implements state-of-the-art CNN-based models drawn from recent AV papers for cross-comparison with graph-learning based techniques. In contrast to the works mentioned above, roadscene2vec utilizes a scene-graph IR that encodes the spatial and semantic relations between all the traffic participants in a frame. This form of representation is similar to a knowledge graph with the key distinction that scene-graphs explicitly encode knowledge about a visual scene. A scene-graph representation used with an MRGCN may lead to state of the art performance at assessing the subjective risk of driving maneuvers. The present invention implements examples of multi-relational graph learning models (MRGCN and MRGIN) as well as model skeletons to enable users to easily evaluate other graph learning model formulations.

The present invention features a computing system for generating one or more scene-graphs based on one or more images and calculating a probability of collision based on the one or more scene-graphs. In some embodiments, the system may comprise a data generation module for accepting the one or more images and then extracting one or more objects from each image. The system may further comprise a preprocessing module for resiting and recoloring each image of the one or more images before scene-graph extraction. The system may further comprise a scene-graph extraction module for computing an inverse-perspective mapping transformation of the image to generate a bird's-eye view (BEV) representation of each image, calculating relations between each object for each image, and generating a scene-graph for each image based on the aforementioned calculations. Each scene-graph may comprise one or more nodes representing the corresponding objects The system may further comprise a collision prediction module for embedding each node of each scene-graph, assigning each node a score based on a potential for collision with the ego-object, filtering out any irrelevant nodes, condensing the one or more scene-graphs into a spatial graph embedding, generating a spatia-temporal graph embedding from the spatial graph embedding, and calculating a confidence value for whether or not a collision will occur. The system may further comprise a risk assessment module for processing the spatio-temporal graph embedding through a temporal attention layer of the LSTM network to generate a context vector, processing the context vector through an LSTM decoder to generate a final spatio-temporal graph embedding, and calculating a confidence value for whether or not the one or more images contain a risky driving maneuver.

The present invention features a method for generating one or more scene-graphs based on one or more images and calculating a probability of collision based on the one or more scene-graphs. In some embodiments, the method may comprise accepting the one or more images from an external source and extracting the one or more objects for each image. The method may further comprise resiting and recoloring each image of the one or more images before scene-graph extraction. The method may further comprise computing a bird's-eye view (BEV) representation of each image, estimating a position of the one or more objects relative to the ego-object based on the one or more bounding boxes of each BEV representation, identifying a plurality of relations between objects for each image, and generating a scene-graph for each image based on the aforementioned calculations. Each scene-graph may comprise one or more nodes representing the corresponding objects.

The method may further comprise embedding each node of each scene-graph through use of a machine learning model, assigning each node a score based on a potential for collision with the ego-object, filtering out any nodes determined to be irrelevant based on the score, condensing the one or more scene-graphs into a spatial graph embedding, generating a spatio-temporal graph embedding from the spatial graph embedding through use of a long short-term memory (LSTM) network, and calculating a confidence value for whether or not a collision will occur. The method may further comprise processing the spatio-temporal graph embedding through a temporal attention layer of the LSTM network to generate a context vector, processing the context vector through an LSTM decoder to generate a final spatiatemporal graph embedding, and calculating a confidence value for whether or not the one or more images contain a risky driving maneuver.

One of the unique and inventive technical features of the present invention is the generation of scene-graphs from image files based on calculated relations between objects. Without wishing to limit the invention to any theory or mechanism, it is believed that the technical feature of the present invention advantageously provides for highly accurate, energy-efficient, and time-efficient risk and collision assessments for automated driving systems. None of the presently known prior references or work has the unique inventive technical feature of the present invention.

Another unique and inventive technical feature of the present invention is the assessment of collision risk. Without wishing to limit the invention to any theory or mechanism, it is believed that the technical feature of the present invention advantageously provides for the prediction of a future state of scene based on a scene graph and a spatia-temporal model. This is advantageous for the training and execution of self-driving automobile software as potential crashes can be identified earlier and more accurately, allowing for safer travel in automated vehicles. None of the presently known prior references or work has the unique inventive technical feature of the present invention.

Furthermore, this inventive technical feature contributed to a surprising result. For example, one skilled in the art would determine that the spatiotemporal model would be unable to achieve the prediction of a future state as the state of the art is unable to do so with the same technology. In prior systems, an entire sequence of driving was considered in training sets to teach a machine learning model to identify whether or not a sequence included a risky maneuver or a non-risky maneuver. Surprisingly, the present invention is able to be adjusted from the risk assessment model in such a way to predict collisions with a similar model. This is due to the fact that in the present invention, the machine learning model is trained to view each frame of a driving sequence and to assess, as early as possible, whether or not a collision will occur before the end of the sequence through spatiotemporal predictions. Thus, by implementing a spatiotemporal model and new parameters in the machine learning model, the inventive feature of the present invention contributed to a surprising result.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

BRIEF DESCRIPTION OF THE SEVERAL VIEWS OF THE DRAWING(S)

The features and advantages of the present invention will become apparent from a consideration of the following detailed description presented in connection with the accompanying drawings in which.

Figure 3:
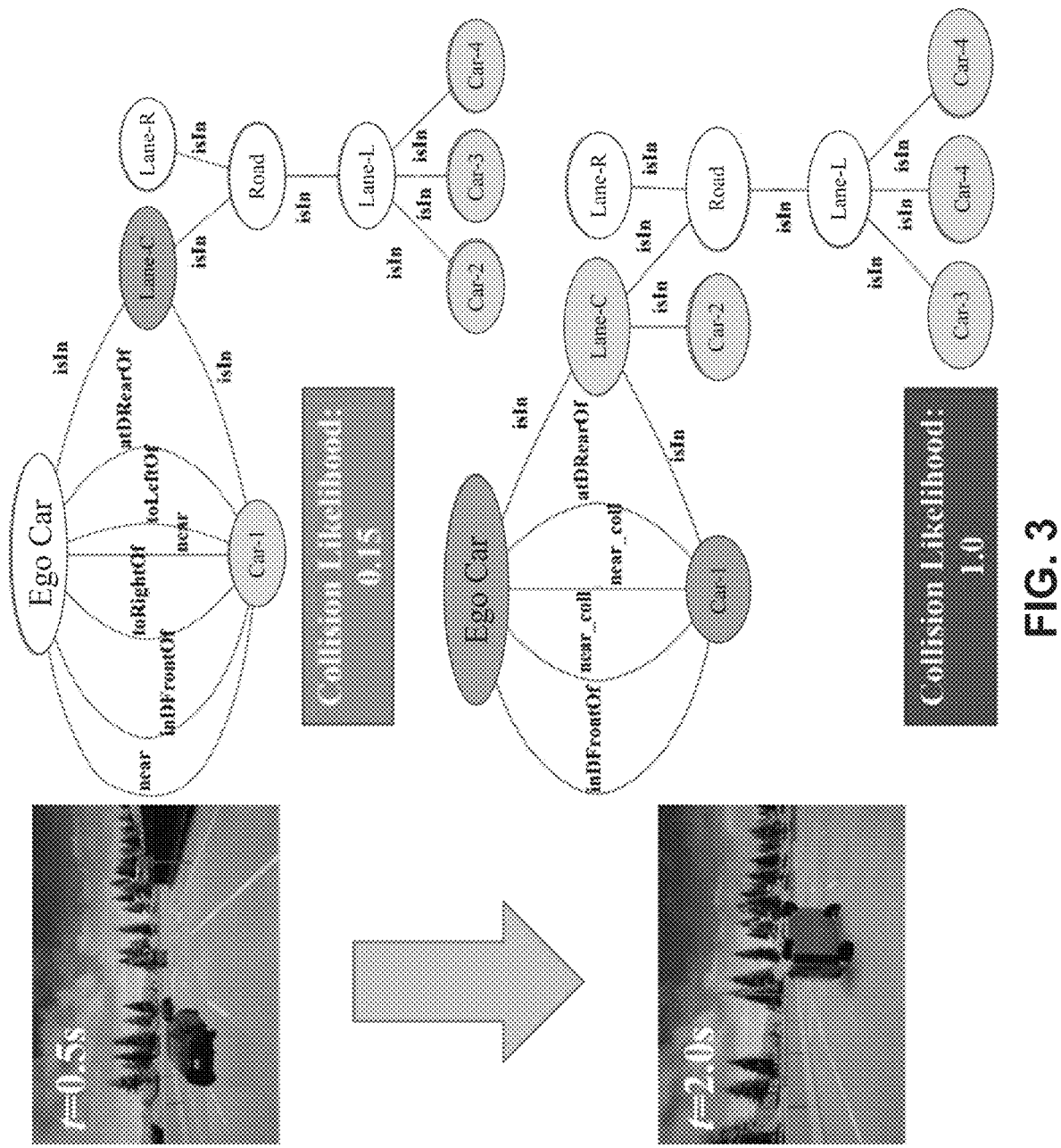
Figure 4:
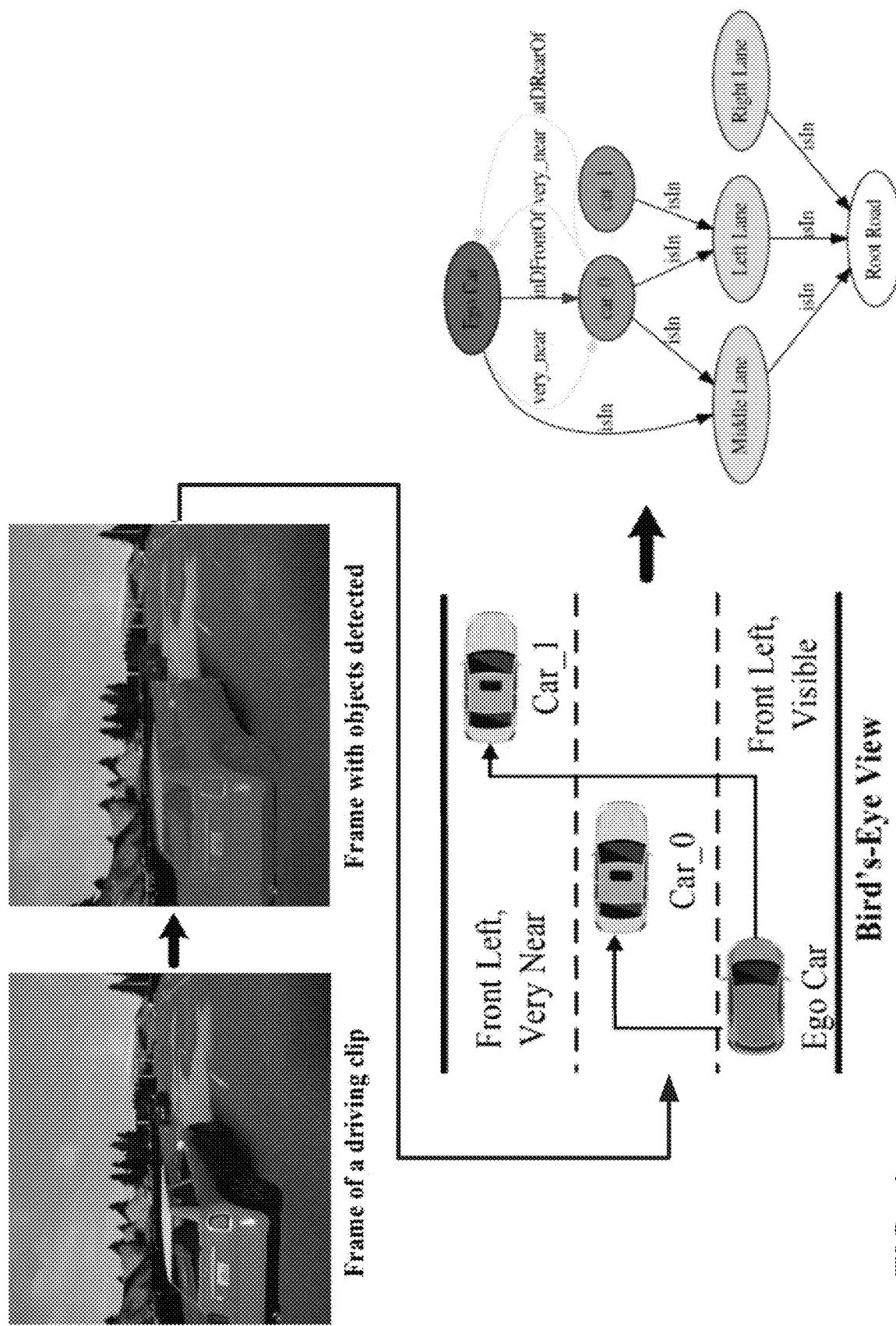

FIG. 3 shows an example of how SG2VEC predicts collisions using scene-graphs. Each node's color indicates its attention score (importance to the collision likelihood) from orange (high) to green (low), FIG. 4 shows an illustration of scene-graph extraction using the Real Image Pipeline. In this process, the first step is to detect a list of objects on each frame of a clip. Then, each frame is projected to its bird's-eye view to better approximate the spatial relations between objects. Finally, a scene-graph is constructed using the list of detected objects and their attributes.

Figure 5:
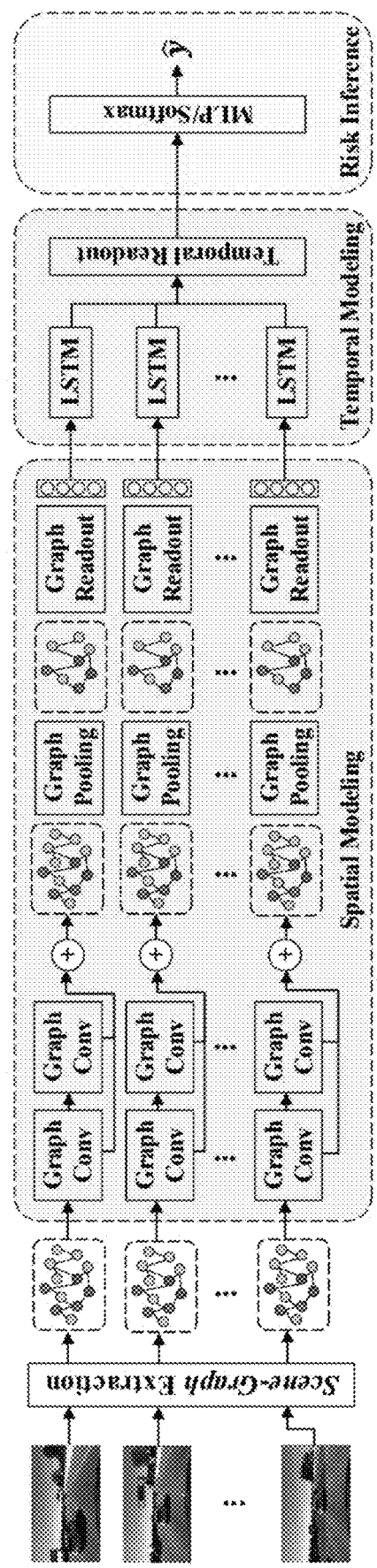

FIG. 5 shows an illustration of the present invention's architecture. It first converts each image $I_t \in I$ to a scene-graph G, via the Scene-Graph Extraction Pipeline. Next, it converts each $G_t$ to its corresponding scene-graph embedding $h_{G_t}$ with layers in Spatial Modeling. Then, it temporally models these scene-graph embeddings to acquire the spatio-temporal representation Z for a scene-graph sequence. Finally, the risk inference y of a clip is calculated from Z using an MLP with a Softmax activation function.

Figure 6:
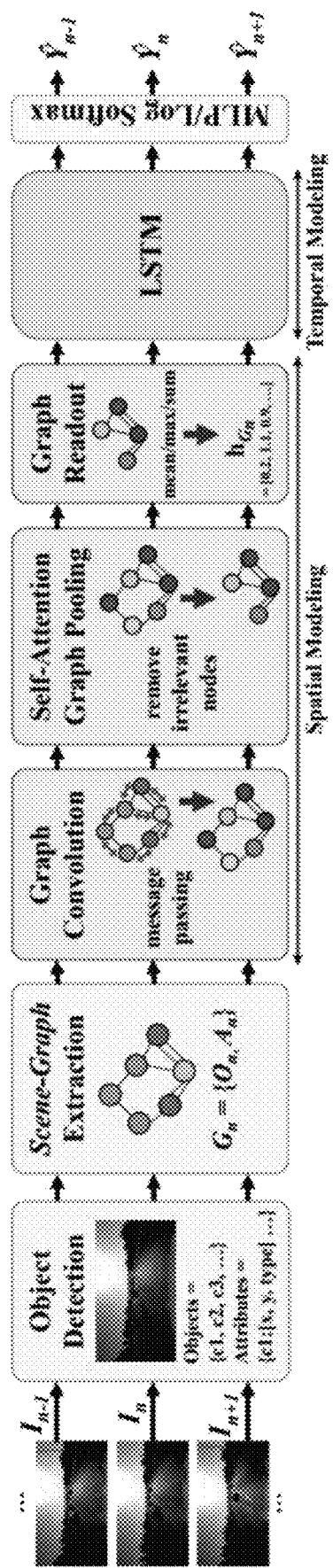

FIG. 6 shows an additional illustration of SG2VEC's architecture.

Figure 7:
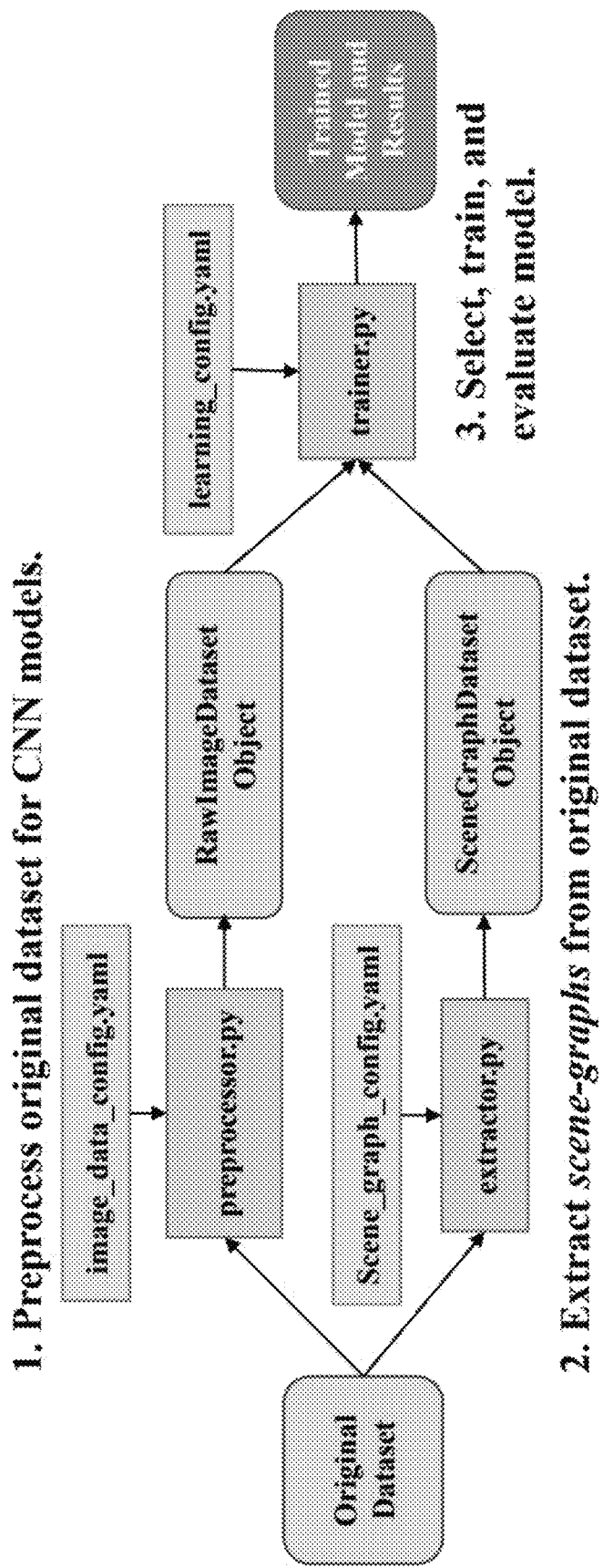

FIG. 7 shows a workflow for using roadscene2vec to preprocess a dataset; extract scene-graphs from the dataset; and select, train, and evaluate a model on the dataset, FIG. 8 shows a demonstration of the scene-graph visualization tool that enables the user to inspect: (i) an original input image, (ii) the object detection results, (iii) the birds-eye view projection of the image, and (iv) the resultant scene-graph.

Figure 9:
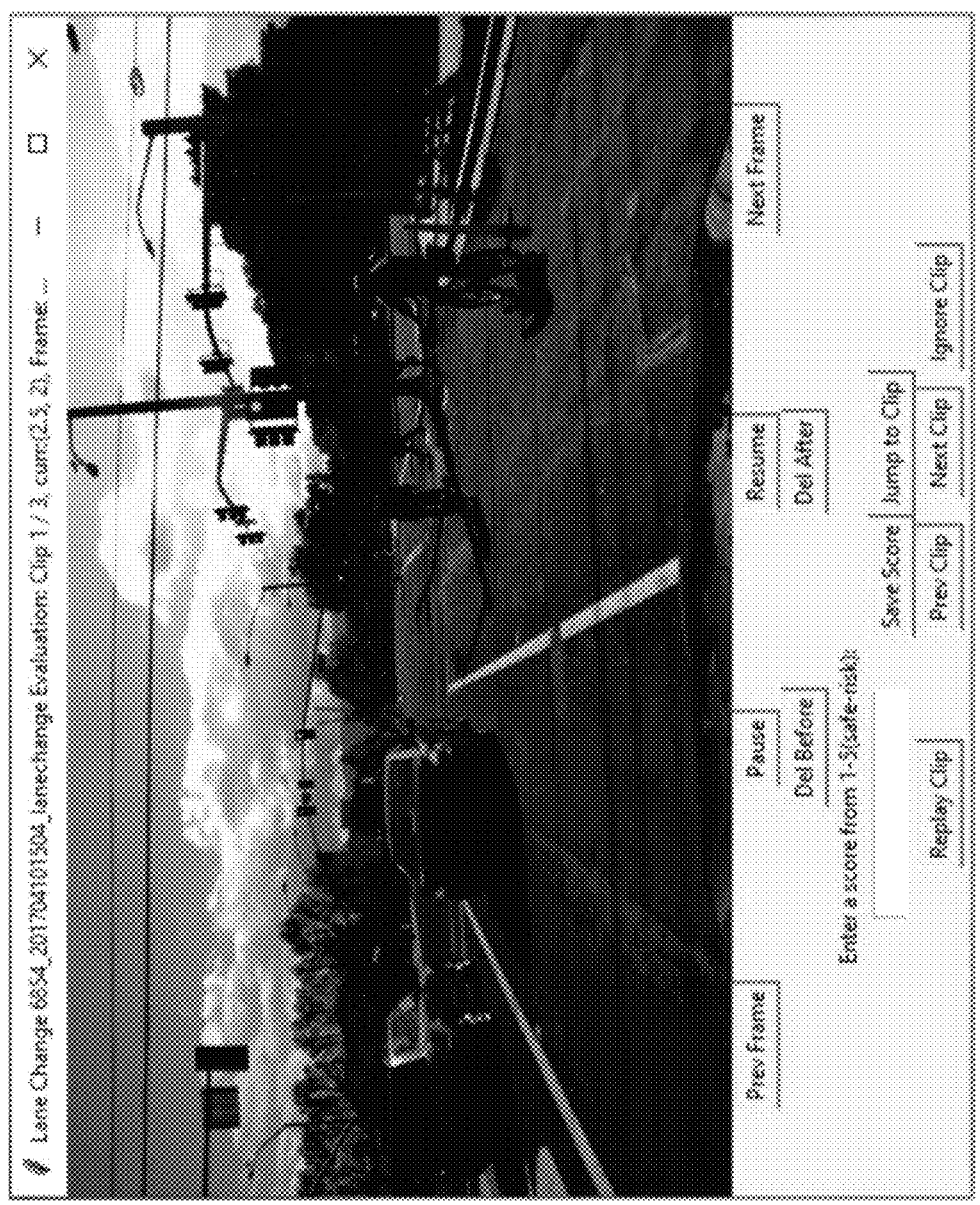

FIG. 9 shows an example of a user interface of the annotator tool, used to label, filter, and trim datasets.

FIG. 10 shows a table of scene graph configuration options and their descriptions. Each of these parameters can be reconfigured by the user to produce custom scene-graphs.

Figure 11:
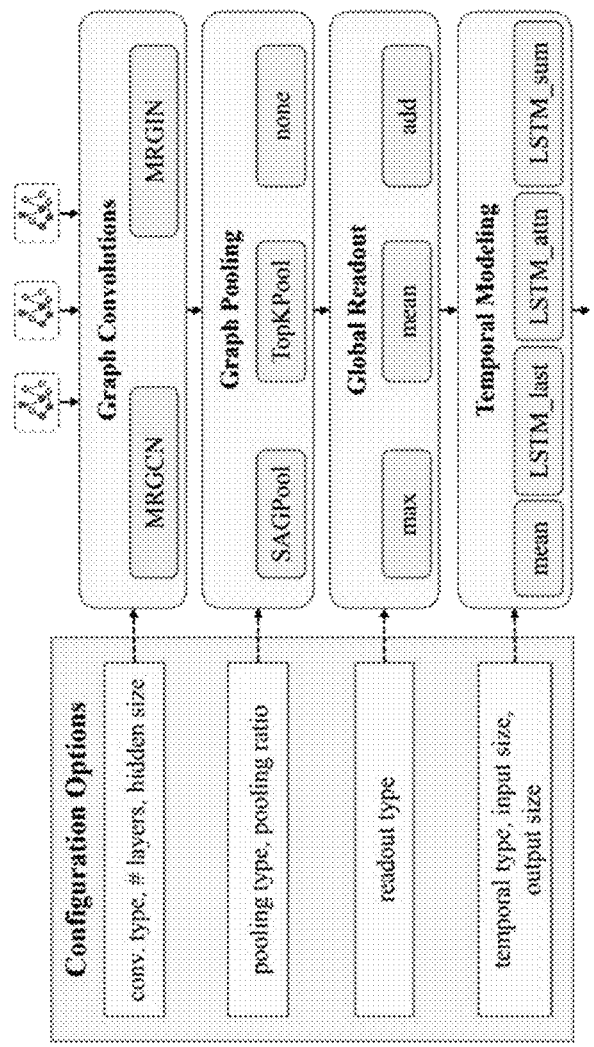

FIG. 11 shows graph learning model configuration options provided in roadscene2vec.

Figure 12:
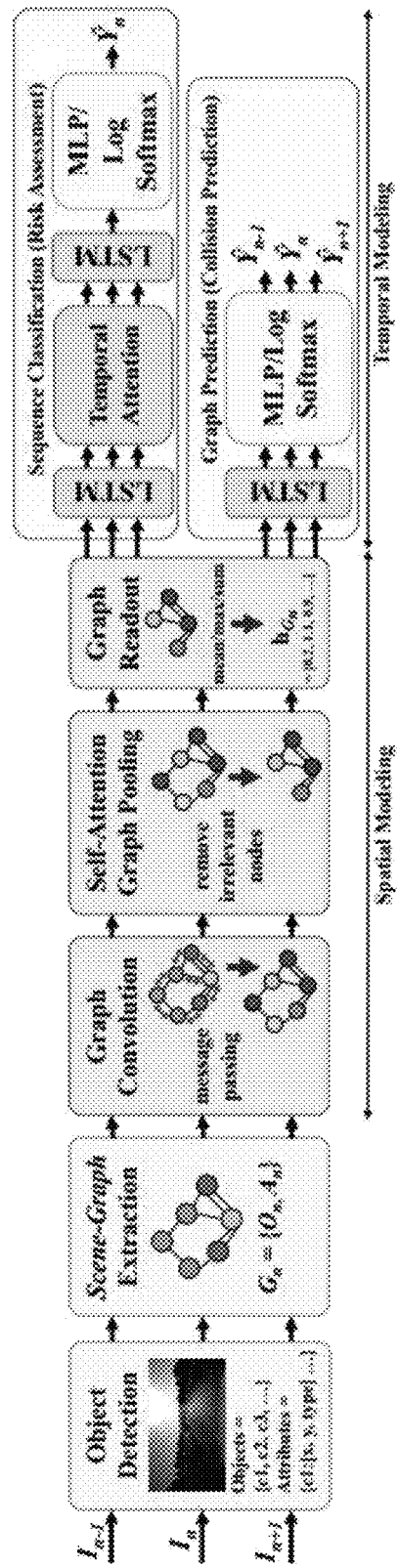

FIG. 12 shows the architecture of the configurable scene-graph based AV perception model. The two pre-implemented temporal modeling pipelines for specific AV tasks are shown (sequence classification and graph prediction). However, users can remove or replace these model components for performing other AV tasks such as graph classification or scenario classification.

FIGS. 13A-13B show an accuracy and AUC comparison between the approaches of the present invention (Real Image and Carla GT) and prior references on different datasets.

FIG. 13C shows a table of the results of the Carla GT approach on a 1043-syn dataset with various spatial and temporal modeling settings. In these experiments, MR-GCN layers with 64 hidden units and sum-pooling were used as the graph readout operation.

FIG. 13D shows the results of comparing transferability between the present model and the prior reference. In this experiment, the model was trained using hyper-parameters on both the 271-syn dataset and 1043-syn dataset. Then, the accuracy of both approaches was tested on both the original dataset and the 571-honda dataset.

Figure 14:
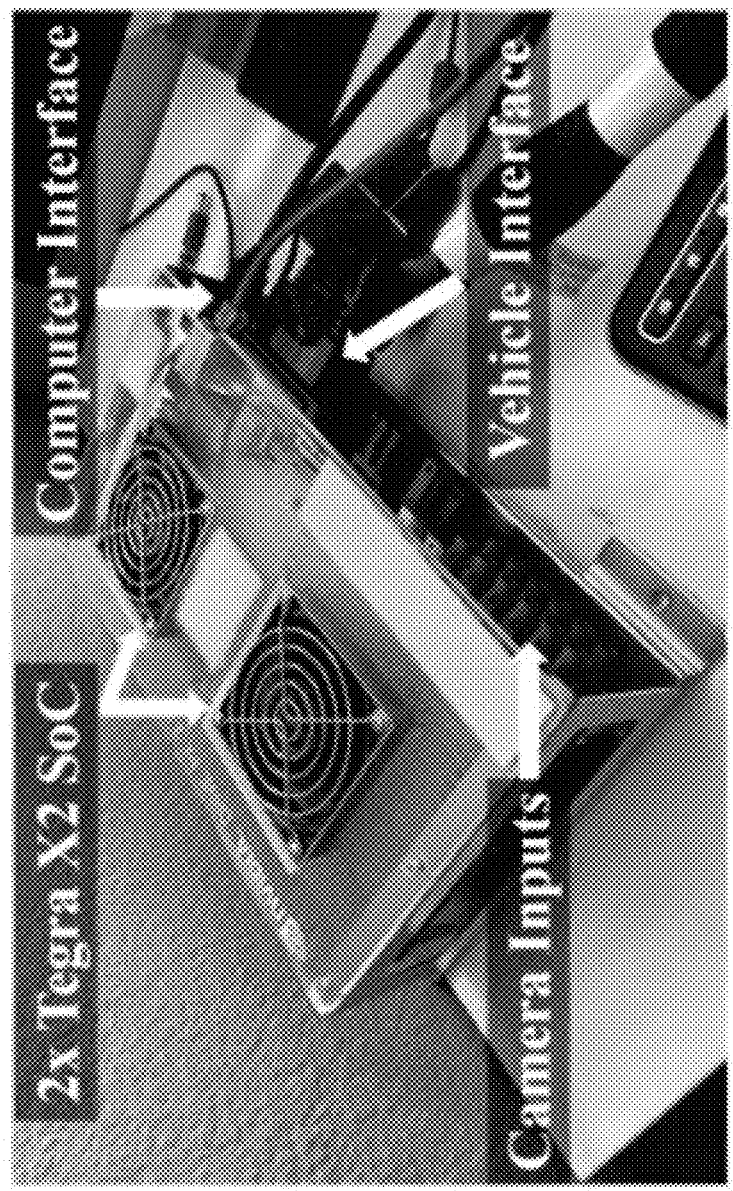

FIG. 14 shows an experimental setup for evaluating SG2VEC and DPM on the industry-standard Nvidia® DRIVE PX 2 hardware.

FIG. 15A shows a table of classification accuracy, AUC, and MCC for SG2VEC and DPM, FIG. 15B shows a table of average time of prediction (ATP) for collisions.

FIG. 15O shows a table of SG2VEC ablation results on the 1043-syn dataset.

Figures 15D, 15E:
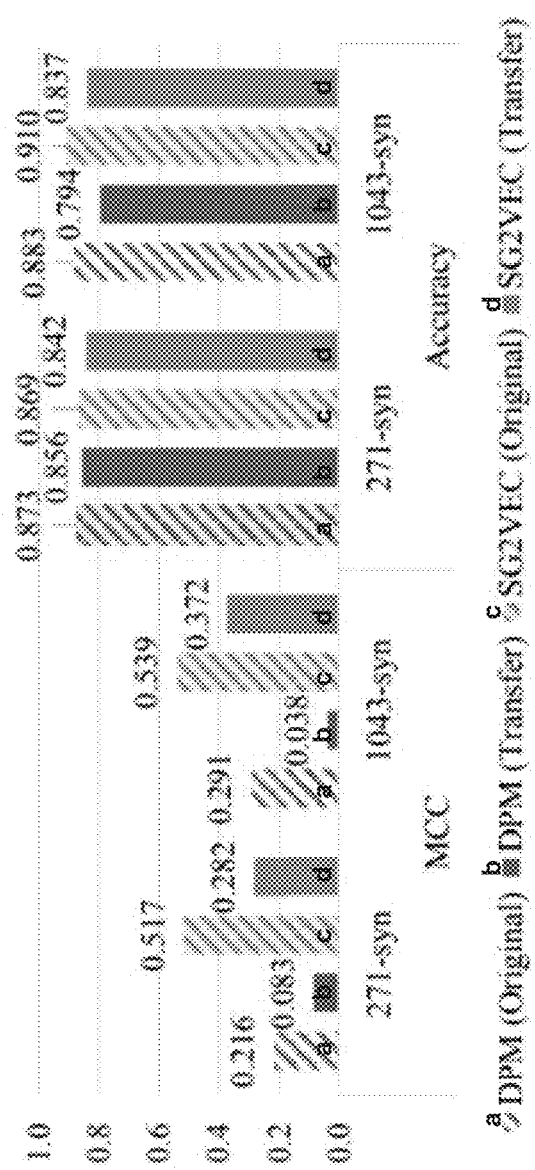

FIG. 15D shows a graph of performance after transferring the models trained on synthetic 271-syn and 1043-syn datasets to the real-world 571-honda dataset.

FIG. 15E shows a table of performance evaluation of inference on 271-syn on the Nvidia® DRIVE PX 2.

FIG. 16A shows a table of risk assessment results for MRGCN, MRGIN, ResNet-50, and CNN+LSTM.

FIG. 16B shows a table of collision prediction accuracy, AUC, and MCC for different models in roadscene2vec.

FIG. 16C shows a table of The results of comparing transferability between MRGCN, ResNet-50, and CNN+LSTM. In this experiment, each model was trained on both the 271-syn dataset and 1043-syn dataset: Then the accuracy of the trained model was evaluated on both the original dataset and the 571-honda dataset without any domain adaptation.

Figure 17:

FIG. 17 shows examples of driving scenes from synthetic datasets (1043-syn), a typical real-world dataset (571-honda), and a complex real-world dataset (620-dash). In 1043-syn, all driving scenes occur on highways with the same camera position and clearly defined road markings; lighting and weather are dynamically simulated in CARLA. In 571-honda driving scenes occur on multiple types of clearly marked roads but lighting, camera angle, and weather are consistent across scenes. 620-dash contains a much broader range of camera angles as well as more diverse weather and lighting conditions, including rain, snow, and night-time driving; it also contains a large number of clips on unpaved or unmarked roadways, as shown.

DETAILED DESCRIPTION OF THE INVENTION

Figure 1:
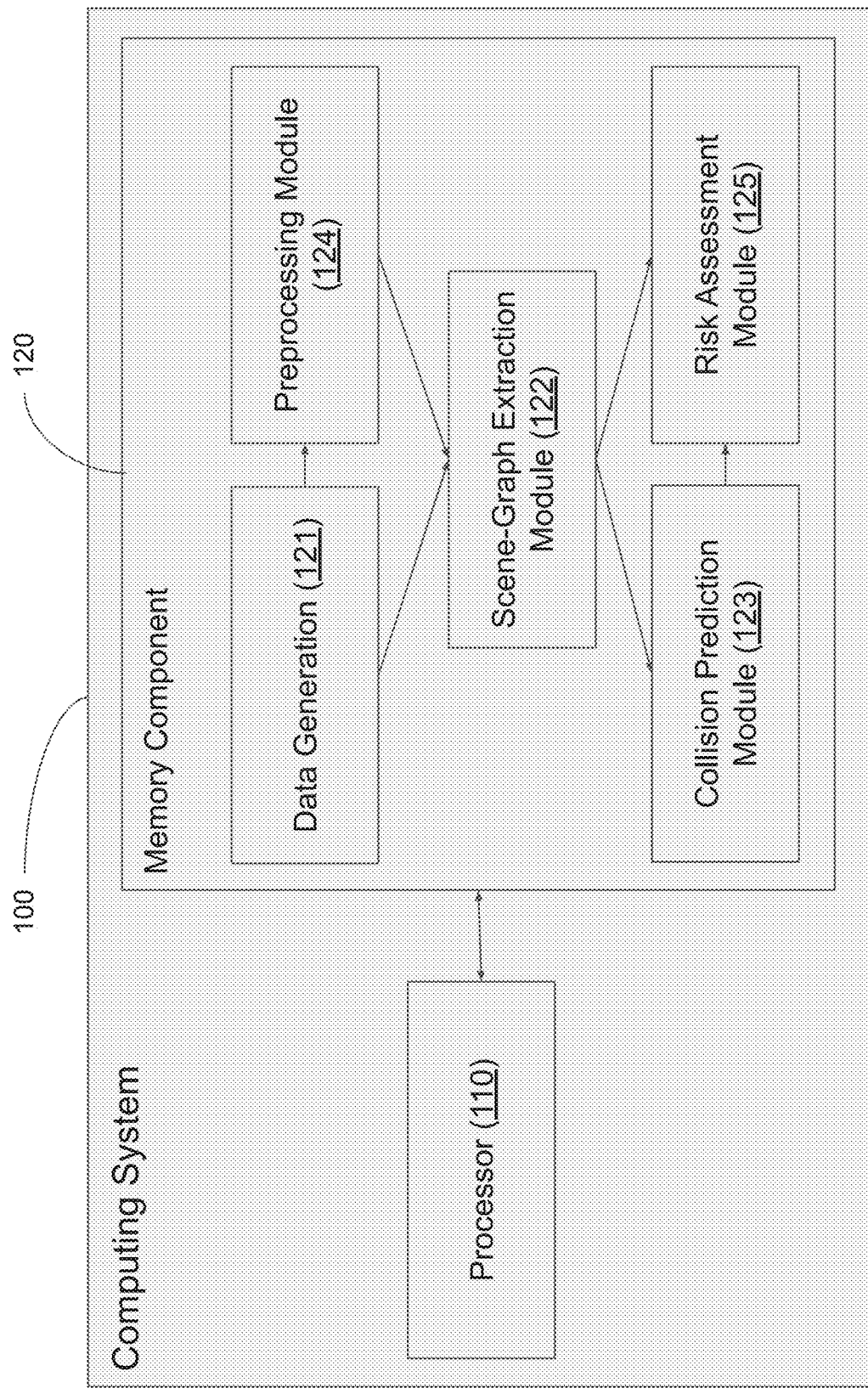
FIG. 1 shows a schematic of a system for generating one or more scene-graphs based on one or more images and calculating a probability of collision based on the one or more scene-graphs.

Following is a list of elements corresponding to a particular element referred to herein:
- 100 computing system
- 110 processor
- 120 memory component
- 121 data generation module
- 122 scene-graph extraction module
- 123 collision prediction module
- 124 preprocessing module
- 125 risk assessment module Referring now to FIG. 1, the present invention features a computing system (100) for generating one or more scene-graphs based on one or more images and calculating a probability of collision based on the one or more scene-graphs. In some embodiments, the system (100) may comprise a processor (110) capable of executing computer-readable instructions, and a memory component (120) communicatively coupled to the display component and the processor (110). The memory component (120) may comprise a data generation module (121) comprising computer-readable instructions for accepting the one or more images, identifying one or more objects in each image, identifying an ego-object in each image, and extracting the one or more objects and the ego-object from the one or more images as an object dataset for each image. The memory component (120) may further comprise a preprocessing module (124) comprising computer-readable instructions for resiting and recoloring each image of the one or more images before scene-graph extraction.

The memory component (120) may further comprise a scene-graph extraction module (122) comprising computer-readable instructions for calculating a bounding box for each object of each object dataset, computing an inverse-perspective mapping transformation of the image to generate a bird's-eye view (BEV) representation of each image, projecting the one or more bounding boxes onto the BEV representation of each corresponding image and estimating a position of the one or more objects relative to the ego-object based on the one or more bounding boxes of each BEV representation. The computer-readable instructions may further comprise identifying a proximity relation between the ego-object and each object of the object dataset for each image by measuring a distance between the ego-object and each object, identifying a directional relation between the ego-object and each object of the object dataset for each image by determining a relative orientation of the ego-object and each object, and identifying a belonging relation between each object and a lane selected from a group consisting of a left lane, a middle lane, and a right lane by measuring a horizontal displacement of each object the object dataset relative to the ego-object for each image. The computer-readable instructions may further comprise generating a scene-graph for each image based on the BEV representation, the one or more proximity relations, the one or more directional relations, and the one or more belonging relations. Each scene-graph may comprise one or more nodes representing the corresponding ego-object and the corresponding object dataset The memory component (120) may further comprise a collision prediction module (123) comprising computer-readable instructions for embedding each node of each scene-graph through use of a machine learning model, assigning each node a score based on a potential for collision with the ego-object, filtering out any nodes determined to be irrelevant based on the score, condensing the one or more scene-graphs into a spatial graph embedding, generating a spatio-temporal graph embedding from the spatial graph embedding through use of a temporal model, and calculating a confidence value for whether or not a collision will occur. AH modules of the memory component (120) may be communicatively coupled to each other.

The memory component (120) may further comprise a risk assessment module (125) comprising computer-readable instructions for processing the spatio-temporal graph embedding through a temporal attention layer of the sequence model to generate a context vector, processing the context vector through a temporal decoder to generate a final spatia-temporal graph embedding, and calculating a confidence value for whether or not the one or more images contain a risky driving maneuver.

In some embodiments, the one or more images may be gathered from real-life images, a simulation, or a combination thereof. Assigning each node a score and filtering out irrelevant nodes may be carried out through a self-attention graph pooling layer. Calculating the confidence value may be carried out through a multi-layer perceptron. The one or more objects may be selected from a group consisting of a car, a motorcycle, a bicycle, a pedestrian, a light, a lane, and a sign. In this case, the scene graph extraction module (122) may further comprise computer-readable instructions for extracting a rotation, acceleration, and velocity for each car, motorcycle, and bicycle object. Furthermore, the scene graph extraction module (122) may further comprise computer-readable instructions for extracting a light state for each light object and a sign value for each sign object.

Figure 2:
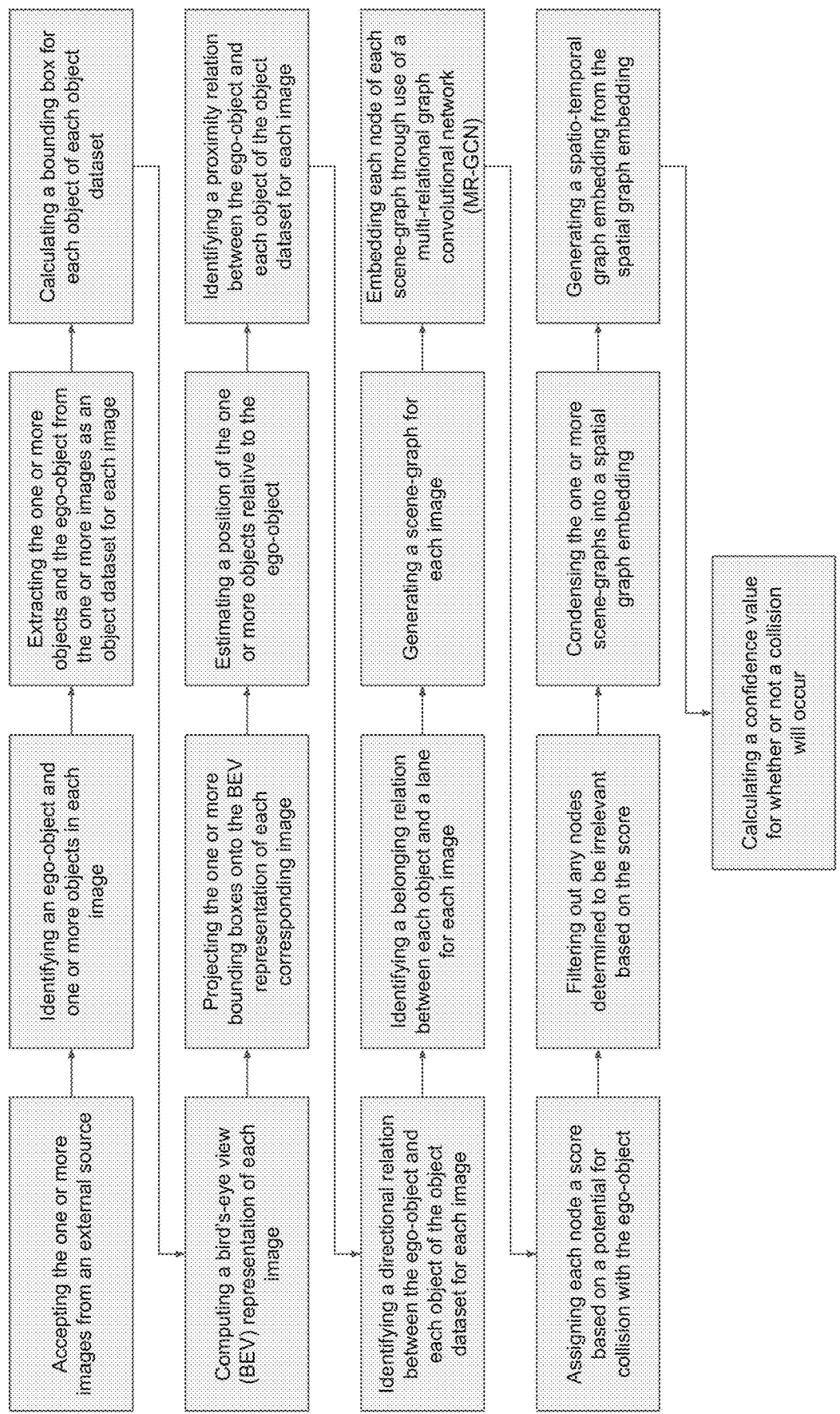
FIG. 2 shows a flow chart of a method for generating one or more scene-graphs based on one or more images and calculating a probability of collision based on the one or more scene-graphs.

Referring now to FIG. 2, the present invention features a method for generating one or more scene-graphs based on one or more images and calculating a probability of collision based on the one or more scene-graphs. In some embodiments, the method may comprise accepting the one or more images from an external source, identifying one or more objects in each image, identifying an ego-object in each image, extracting the one or more objects and the ego-object from the one or more images as an object dataset for each image. The method may further comprise resiting and recoloring each image of the one or more images before scene-graph extraction. The method may further comprise calculating a bounding box for each object of each object dataset, computing an inverse-perspective mapping transformation of the image to generate a bird's-eye view (BEV) representation of each image, projecting the one or more bounding boxes onto the BEV representation of each corresponding image, and estimating a position of the one or more objects relative to the ego-object based on the one or more bounding boxes of each BEV representation. Calculating a bounding box for each object may comprise using a state-of-the-art object detection model (Detectron2) based on Faster Region Based Convolutional Neural Networks (RCNN).

The method may further comprise identifying a proximity relation between the ego-object and each object of the object dataset for each image by measuring a distance between the ego-object and each object, identifying a directional relation between the ego-object and each object of the object dataset for each image by determining a relative orientation of the ego-object and each object, and identifying a belonging relation between each object and a lane selected from a group consisting of a left lane, a middle lane, and a right lane by measuring a horizontal displacement of each object the object dataset relative to the ego-object for each image. The method may further comprise generating a scene-graph for each image based on the BEV representation, the one or more proximity relations, the one or more directional relations, and the one or more belonging relations. Each scene-graph may comprise one or more nodes representing the corresponding ego-object and the corresponding object dataset.

The method may further comprise embedding each node of each scene-graph through use of a machine learning model, assigning each node a score based on a potential for collision with the ego-object, filtering out any nodes determined to be irrelevant based on the score, condensing the one or more scene-graphs into a spatial graph embedding, generating a spatia-temporal graph embedding from the spatial graph embedding through use of a temporal model, and calculating a confidence value for whether or not a collision will occur. The method may further comprise processing the spatia-temporal graph embedding through a temporal attention layer of the sequence model to generate a context vector, processing the context vector through a temporal decoder to generate a final spatio-temporal graph embedding, and calculating a confidence value for whether or not the one or more images contain a risky driving maneuver.

In some embodiments, the one or more images may be gathered from real-life images, a simulation, or a combination thereof. Assigning each node a score and filtering out irrelevant nodes may be carried out through a self-attention graph pooling layer. Calculating the confidence value may be carried out through a multi-layer perceptron. The one or more objects may be selected from a group consisting of a car, a motorcycle, a bicycle, a pedestrian, a light, a lane, and a sign. In this case, the method may further comprise extracting a rotation, acceleration, and velocity for each car, motorcycle, and bicycle object. Furthermore, the method may further comprise extracting a light state for each light object and a sign value for each sign object.

In some embodiments, the machine learning model may comprise a multi-relational graph convolutional network (MR-GCN), a multi-relational graph isomorphism network (MR-GIN), a multi-layer perceptron (MLP), or a convolutional neural network (CNN). In some embodiments, the sequence model may comprise a recurrent neural network (RNN), a long short-term memory (LSTM) network, a multi-layer perceptron (MLP), or a statistical method.

Several approaches have been proposed for extracting scene-graphs from images by detecting the objects in a scene and then identifying their visual relationships. However, these works have focused on single general images instead of a sequence of images as it arises in autonomous driving, where higher accuracy is demanded. Thus, the present invention implements a partially rule-based process to extract objects and their attributes from images called the Real Image Pipeline. Besides, to evaluate how the approach performs with scene-graphs containing ground truth information, the present invention implements the Carla Ground Truth (GT) Pipeline as a surrogate for the ideal situation where the attributes for each object can be correctly extracted. After the objects in a scene and their attributes have been extracted, the scene-graphs are constructed as described.

Real Image Pipeline: In this pipeline, object attributes and bounding boxes are extracted directly from images using state-of-the-art image processing techniques. As FIG. 4 shows, each image is converted into a collection of objects O, using Detectron2, a state-of-the-art object detection model based on Faster RCNN. Next, OpenCV™'s perspective transformation library is used to generate a top-down perspective of the image, commonly known as a "birds-eye view" projection. This projection allows for each object's location to be approximated relative to the road markings and the ego vehicle. Next, for each detected object in $O_t$, its estimated location and class type (cars, motorcycles, pedestrians, lanes, etc.) are used to compute the attributes required in budding the scene-graph.

Carla Ground Truth Pipeline: Object detection and location estimation with solely monocular cameras can be unstable because of factors such as weather and camera position, which can impact the correctness of the image-based scene-graph construction pipeline and thus the approach's performance. To evaluate the methodology under the assumption that object attributes can be extracted without error, scene-graphs are built using the ground-truth location and class information for each vehicle in the Carla GT Pipeline. This information is extracted directly from Carla simulator without using any image processing steps.

After collecting the list of objects in each image and their attributes, the corresponding scene-graphs are constructed as follows. For each image $I_t$, the corresponding scene-graph is denoted by $G_t=\{O_t, A_t\}$ and model it as a directed multi-graph where multiple types of edges connect nodes. The nodes of a scene-graph, denoted as $O_t$, represent the objects in a scene such as lanes, roads, traffic signs, vehicles, pedestrians, etc. The edges of a scene-graph are represented by the corresponding adjacency matrix $A_t$, where each value in $A_t$ represents the type of the edges. The edges between two nodes represent the different kinds of relations between them (e.g., near, Front Left, isIn, etc.).

In assessing the risk of driving behaviors, traffic participants' relations that are considered to be useful are the distance relations and the directional relations. The assumption made here is that the local proximity and positional information of one object will influence the other's motion only if they are within a certain distance. Therefore, only the location information is extracted for each object and a simple rule is adopted to determine the relations between the objects using their attributes (e.g., relative location to the ego car), as shown in FIG. 4. For distance relations, two objects are assumed to be related by one of the relations $r \in \{$Near Collision (4 ft.), Super Near (7 ft.), Very Near (10 ft.), Near (16 ft.), Visible (25 ft.)$\}$ if the objects are physically separated by a distance that is within that relation's threshold. In the case of the directional relations, two objects are assumed to be related by the relation $r \in \{$Front Left, Left Front, Left Rear, Rear Left, Rear Right, Right Rear, Right Front, Front Right$\}$ based on their relative positions if they are within the Near threshold distance from one another.

In addition to directional and distance relations, the present invention implements the sIn relation that connects vehicles with their respective lanes. For the Carla GT Pipeline, the ground-truth lane assignments for each vehicle are extracted from the simulator directly. For the Real Image Pipeline, each vehicle's horizontal displacement relative to the ego vehicle is used to assign vehicles to either the Left Lane, Middle Lane, or Right Lane based on a known lane width. The present invention only includes these three-lane areas and, as such, vehicles in all left lanes are mapped to the same Left Lane node and all vehicles in right lanes to the Right Lane node. If a vehicle overlaps two lanes (i.e., during a lane change), an isIn relation is assigned to both lanes. FIG. 4 illustrates an example of resultant scene-graph.

The present invention implements three major components: spatial model, temporal model, and risk inference. The spatial model outputs the embedding $h_{G_t}$ for each scene-graph $G_t$. The temporal model processes the sequence of scene-graph embeddings $h_t=\{h_{G_1}, h_{G_2}, \ldots, h_{G_T}\}$ and produces the spatia-temporal embedding Z. The risk inference component outputs each driving clip's final risk assessment, denoted as Y by processing the Spatio-temporal embedding Z. The overall network architecture is shown in FIG. 5.

The spatial model of the present invention uses MR-GCN layers to compute the embedding for a scene-graph. The use of MR-GCN allows for the capture of multiple types of relations on each scene-graph $Gt=\{Ot, At\}$. In the Message Propagation phase, a collection of node embeddings and their adjacency information serve as the inputs to the MR-GCN layer. Specifically, the l-th MR-GCN layer updates the node embedding, denoted as $h_v^{(l)}$, for each node v as follows:

$$h_v^{(l)} = \Phi_0 \cdot h_v^{(l-1)} + \sum_{r \in A_t} \sum_{u \in N_r(v)} \frac{1}{|N_r(v)|} \Phi_r \cdot h_u^{(l-1)}$$

where $N_r(v)$ denotes the set of neighbor indices of node v with the relation $r \in A_t$. $\Phi_r$ is a trainable relation-specific transformation for relation r in the MR-GCN layer. Since the information in (l−1)-th layer can directly influence the representation of the node at l-th layer, MR-GCN uses another trainable transformation $\Phi_0$ to account for the self-connection of each node using a special relation. Here, each node embedding $h_v^{(0)}$, $\forall v \in O_t$, is initialized by directly converting the node's type information to its corresponding one-hot vector.

Typically, the node embedding becomes more refined and global as the number of graph convolutional layers, L, increases. However, the features generated in earlier iterations might generalize the learning better. Therefore, the node embeddings generated from all the MR-GCN layers are considered. To be more specific, the embedding of node v at the final layer, denoted as $H_v^L$, is calculated by concatenating the features generated from all the MR-GCN layers, as follows, $$H_v^L = \text{CONCAT}(\{h_v^{(l)}\}|l=0,1,\ldots,L)$$

The collection of node embeddings of scene-graph $G_t$ after passing through L layers of MR-GCN is denoted as $X_t^{prop}$ (L can be 1, 2 or 3).

The node embedding $X_t^{prop}$ is further processed with an attention-based graph pooling layer. Such an attention-based pooling layer can improve the explainability of predictions and is typically considered as a part of a unified computational block of a graph neural network (GNN) pipeline. In this layer, nodes are pooled according to the scores predicted from either a trainable simple linear projection or a separate trainable GNN layer. The graph pooling layer that uses the SCORE function is denoted as TopkPool and the one that uses the SCORE function as SAGPool. The calculation of the overall process is presented as follows:

$$\alpha = \text{SCORE}(X_t^{prop}, A_t)$$

$$P = \text{top}_k(\alpha)$$

where $\alpha$ stands for the coefficients predicted by the graph pooling layer for nodes in $G_t$ and P represents the indices of the pooled nodes which are selected from the top k of the nodes ranked according to $\alpha$. The number k of the nodes to be pooled is calculated by a predefined pooling ratio, pr, and using $k = pr \times |O_t|$, where only a constant fraction $p_r$ of the embeddings of the nodes of a scene-graph are considered to be relevant (i.e., 0.25, 0.5, 0.75). The node embeddings and edge adjacency information after pooling are denoted by $X_t^{prop}$ and $A_t^{prop}$ and are calculated as follows:

$$X_t^{pool} = (X_t^{prop} \odot \tan h(\alpha))_P$$

$$A_t^{pool} = A_t^{prop}{}_{(P,P)}$$

where $\odot$ represents an element-wise multiplication, $(\ )_P$ refers to the operation that extracts a subset of nodes based on P and $(\ )_{(P,P)}$ refers to the formation of the adjacency matrix between the nodes in this subset.

Finally, the model aggregates the node embeddings of the graph pooling layer, $X_t^{pool}$, using a graph READOUT operation, to produce the final graph-level embedding $h_{G_t}$ for each scene-graph G as given by $$h_{G_t} = \text{READOUT}(X_t^{pool})$$

where the READOUT operation can be either summation, averaging, or selecting the maximum of each feature dimension, over all the node embeddings, known as sum-pooling, mean-pooling, or max-pooling, respectively. The process until this point is repeated across all images in 1 to produce the sequence of embedding, $h_I$.

The temporal model of the present invention uses an LSTM for converting the sequence of scene-graph embeddings $h_I$ to the combined spatia-temporal embedding Z. For each timestamp t, the LSTM updates the hidden state $p_t$ and cell state c, as follows, $$p_t, c_t = \text{LSTM}(h_{G_t}, c_{t-1})$$

where $h_{G_t}$ is the final scene-graph embedding from timestamp t. After the LSTM processes all the scene-graph embeddings, a temporal readout operation is applied to the resultant output sequence to compute the final Spatio-temporal embedding Z given by $$Z = \text{TEMPORAL\_READOUT}(p_1, p_2, \ldots, p_T)$$

where the TEMPORAL READOUT operation could be extracting only the last hidden state $p_T$ (LSTM-last), or be a temporal attention layer (LSTM-attn).

Adding an attention layer b to the encoder-decoder based LSTM architecture is shown to achieve better performance in Neural Machine Translation (NMT) tasks. For the same reason, LSTM-attn is included in the architecture. LSTM-attn calculates a context vector q using the hidden state sequence $\{p_1, p_2, \ldots, p_T\}$ returned from the LSTM encoder layer as given by $$q = \sum_{t=1}^{T} \beta_t p_t$$

where the probability $\beta_t$ reflects the importance of $p_t$ in generating q. The probability $\beta_t$ is computed by a Softmax output of an energy function vector e, whose component $e_t$ is the energy corresponding to $p_t$. Thus, the probability $\beta_t$ is formally given by $$\beta_t = \frac{\exp(e_t)}{\sum_{k=1}^{T} \exp(e_k)}$$

where the energy et associated with $p_t$ is given by $e_t = b(s_0, p_t)$. The temporal attention layer b scores the importance of the hidden state pt to the final output, which in the case is the risk assessment. The variable $s_0$ in the temporal attention layer b is computed from the last hidden representation $p_T$. The final Spatiotemporal embedding for a video clip, Z, is computed by feeding the context vector q to another LSTM decoder layer.

The last piece of the model is the risk inference component that computes the risk assessment prediction $\hat{Y}$ using the spatio-temporal embedding Z. This component is composed of a MLP layer followed by a Softmax activation function. Thus, the prediction $\hat{Y}$ is given by $$\hat{Y} = \text{Softmax}(\text{MLP}(Z))$$

The loss for the prediction is calculated as follows, $$\arg\min \text{CrossEntropyLoss}(Y, \hat{Y})$$

For training the model, a mini-batch gradient descent algorithm that updates its parameters by training on a batch of scene-graph sequences is used. To account for label imbalance, class weighting is applied when calculating loss, Besides, several dropout layers are inserted into the network to reduce overfitting.

The present invention may be implemented as a Python® library, integrating various external packages such as APIs from PyTorch™, PyTorch™ Geometric, Detectron2, and CARLA. Note that the present invention may be implemented in any other programming language. roadscene2vec may comprise four key modules: (i) data generation (data.gen) and preprocessing (data.proc), (ii) scene-graph extraction (scene graph), (iii) model training and evaluation (learning), and (iv) visualization (util).

The module data.gen in roadscene2vec may allow researchers to synthesize driving data for their research. To successfully handle complex and long-tail driving scenarios, deep learning approaches typically train their models on large datasets that contain a wide range of "corner cases." However, generating such datasets is expensive and time-consuming in the real-world. Thus, most researchers instead use synthesized datasets containing plenty of these corner cases to evaluate their research ideas.

For this purpose, roadscene2vec integrates the open-source driving simulator, CARLA, which allows users to generate driving data by controlling a vehicle (either in manual mode or autopilot mode) in simulated driving scenarios. On top of that, roadscene2vec also integrates the CARLA Scenario Runner which contains a set of atomic controllers that enable users to automate the execution of complex driving maneuvers.

In roadscene2vec, data.gen produces each driving clip in CARLA's simulated world by (i) selecting one autonomous car randomly, (ii) switching its mode to manual mode, and (iii) using the Scenario Runner to command the vehicle to change lanes. In addition, the data generation tool in roadscene2vec manipulates the various presets in CARLA to specify the number of cars, pedestrians, weather and lighting conditions, etc., for making the generated driving data more diverse. Moreover, through the APIs provided by the Traffic Manager (TM) of the CARLA simulator, the tool can customize the driving characteristics of every autonomous vehicle in the simulated world, such as the intended speed considering the current speed limit, the chance of ignoring the traffic lights, or the chance of neglecting collisions with other vehicles. Overall, the tool allows users to simulate a wide range of very realistic urban driving environments and generate synthesized datasets suitable for training and testing a model.

Using the CARLA Python® API and the CARLA Scenario Runner, the present invention implements a tool in the data.gen module for extracting the road scene's state information as well as the corresponding ego-centric camera images directly from the CARLA simulator for use in roadscene2vec. For each frame in a driving sequence, the present invention stores the attributes of the objects in the scene as a Python® dictionary. These attributes include object type, location, rotation, lane assignment, acceleration, velocity, and light status. For static objects such as traffic lights and signage, the present invention stores the type of object, its location, and light state (light color) or sign value (e.g., speed limit). The datasets in this format are referred to as CARLA datasets. In addition, the tool supports using image-based datasets, such as the camera data extracted from CARLA or the Honda® Driving Dataset used in experiments. The code provided in the data.gen module can be modified to support other driving actions, such as turning, accelerating, braking, and overtaking.

Under the data.gen module, roadscene2vec also provides an annotation tool for quickly and easily labeling both CARLA datasets and image datasets. The annotator offers a graphical user interface (GUI) that enables users to view, label, exclude, or trim specific driving sequences. The annotator enables users to assign one label for each sequence and supports averaging multiple independent labelers' decisions. In addition to the annotation tool, the present invention implements dataset utilities such as train-test splitting, k-fold cross-validation, and downsampling as part of the trainers in the learning.util module.

The data storage and preprocessing functions are implemented through the data.proc module of roadscene2vec. To use a new dataset with roadscene2vec, it must first have the correct directory structure defined in the repository. Next, the input dataset can go through one of the two workflows shown in FIG. 7: (i) the dataset is preprocessed into a "RawImageDataset" to be used with CNNs and other image processing models directly, or (ii) the dataset is sent to the corresponding scene-graph extractor to generate scene-graph representations of every frame in the dataset. The preprocessing step is necessary for the conventional deep-learning models as the input images often need to be resized, reshaped, or sub-sampled before being trained with models to meet memory and space constraints. After preprocessing, the RawImageDataset object stores the sets of driving video clips as image sequences, the labels associated with the video clips, and metadata (such as sequence name/action type). For each image in each clip in the dataset, the image preprocessor loads the image using OpenCV™, resizes and recolors the image according to the configuration settings, and stores the image as a PyTorch™ Tensor. The resulting RawImageDataset object is then serialized and stored as a pickle (.pkl) file.

FIG. 10 describes how an input dataset is converted into a "SceneGraphDataset" object via the scene-graph extraction framework. A list of roadscene2vec's user-configurable scene-graph extraction settings is shown in FIG. 10. In the formulation, each actor (object) in the scene-graph is assigned a type from the set {car, motorcycle, bicycle, pedestrian, lane, light, sign}, matching those defined by CARLA. Users can reconfigure the set of object types to support other dataset types, applications, or ontologies.

The default relation extraction pipeline identifies three kinds of pairwise relations: proximity relations (e.g. visible, near, very near, etc.), directional relations (e.g. Front Left, Rear Right, etc.), and belonging relations (e.g. car 1 isIn left lane). Two objects are assigned the proximity relation, r ∈ {Near Collision (4 ft.), Super Near (7 ft.), Very Near (10 ft.), Near (16 ft.), Visible (25 ft.)} provided the objects are physically separated by a distance that is within that relation's threshold. The directional relation, r∈{Front Left, Left Front, Left Rear, Rear Left, Rear Right, Right Rear, Right Front, Front Right}, is assigned to a pair of objects, in this case between the ego-car and another car in the view, based on their relative orientation and only if they are within the near threshold distance from one another. Additionally, the isIn relation identifies which vehicles are on which lanes (see FIG. 4). The present invention uses each vehicle's horizontal displacement relative to the ego vehicle to assign vehicles to either the Left Lane, Middle Lane, or Right Lane using the known lane width. The current abstraction only considers three-lane areas, and, as such, vehicles in all left lanes and all right lanes are mapped to the same Left Lane node and Right Lane node, respectively. If a vehicle overlaps two lanes (i.e., during a lane change), it is mapped to both lanes.

The set of possible entity types, relation types, relation thresholds, and valid object pairs is defined in the scene graph config file. These settings are entirely user re-configurable, enabling broad design space exploration of different graph extraction methodologies. After graph extraction is completed, the set of all scene-graph sequences, metadata, and labels are saved as a SceneGraphDataset.

Since the CARLA datasets contain a dictionary with a list of objects and their attributes, the present invention directly uses this dictionary to initialize the nodes in the scene-graph. Each node is assigned its type label from the set of actor names and its corresponding attributes (e.g., position, angle, velocity, current lane, light status, etc.) for relation extraction. Once all nodes are added to the scene-graph, the present invention extracts relations between each pair of objects in the scene.

To extract scene-graphs from image-based datasets, the set of objects in a scene and their attributes must be extracted from each image. Mask-RCNN is used to extract the set of objects in the image as well as their bounding boxes. Next, the inverse-perspective mapping transformation of the image is calculated, yielding a top-down 'birds-eye view' (BEV) projection of the scene. By generating this projection and projecting the bounding box coordinates from the original image into the birds-eye view, the position of each vehicle is estimated relative to the ego-vehicle with reasonably high fidelity. This position information, along with the object class information, is used to construct the scene-graphs. However, the BEV projection needs to be re-calibrated for each dataset, as typically, each dataset uses a different camera angle and camera configuration. To facilitate this calibration step, the present invention implements a BEV calibration utility in scene graph.extraction.bev. This utility provides an interactive way for the user to select the road area and calibrate the BEV projection for a new dataset with a single step.

The scene-graph visualization tool, located in the roadscene2vec.util module, consists of a GUI that simultaneously displays an input image side by side with its corresponding scene-graph, as is shown in FIG. 8. This tool enables researchers to experiment with a wide range of relation types and distance thresholds and quickly optimize their scene-graph extraction settings for their specific application or dataset.

The learning module contains a framework for splitting datasets as well as training, testing, and scoring models at various tasks. It also contains the graph learning models as well as the baseline deep learning models. The model submodule contains the model definitions while the util submodule contains the training, evaluation, and scoring functions. The training code supports implementing k-fold cross-validation, a user-definable train:test split, and downsampling and class weighting to correct dataset imbalances. The model specification, training hyperparameters, and dataset configuration settings are loaded from the learning config file, which is user-modifiable.

The graph learning models implemented in roadscene2vec enable various configurations of both spatial modeling and temporal modeling components as shown in FIG. 11. The spatial modeling components that can be configured include (i) graph convolution layers, (ii) graph pooling and graph attention layers, and (iii) graph readout operations. The temporal modeling components that can be configured include (i) temporal modeling layers and (ii) temporal attention layers. Experiments use MRGCN and MRGIN models that are identical in structure and differ only in the type of spatial modeling used.

Two multi-relational graph convolution implementations are provided based on (i) graph convolutional networks (GCNs) and (ii) graph isomorphism networks (GINS). These layers propagate node embeddings across edges via graph convolutions, resulting in a new set of node embeddings. The two implementations differ with regard to how data is propagated through successive graph convolutions. Graph pooling is used to filter the set of node embeddings in the graph to only those most useful for the task. Two types of graph pooling layers extended for multi-relational use cases are enabled: Self-Attention Graph Pooling (SAGPool) and Top-K Pooling (TopkPool). After pooling, a global readout operation is used to collect the set of pooled node embeddings into a unified graph embedding. The present invention implements max, mean, and add readout operations.

The temporal model uses Long Short-Term Memory (LSTM) Dyers to convert the sequence of scene-graph embeddings to either (i) one spatia-temporal embedding (for sequence classification tasks) or (ii) a sequence of spatio-temporal embeddings (for graph classification/prediction tasks). For graph classification/collision prediction tasks, the output from an LSTM layer for each input scene-graph embedding is collected as a sequence of spatia-temporal scene-graph embeddings P that is then sent to an MLP layer to produce the final set of model outputs. For sequence classification tasks, a temporal readout operation is applied to P to compute a single spatia-temporal sequence embedding z by (i) extracting only the last hidden state of the LSTM pT (LSTM-last), (ii) taking the sum over fp, or (iii) using a temporal attention layer (LSTM-attn) to compute an attention-weighted sum of the different elements of P.

In addition to the graph learning models that are core to roadscene2vec, the present invention also provides a set of baseline deep learning models for quickly and easily comparing to typical image-processing approaches. These baselines include (i) a ResNet-50 CNN classifier and (ii) a CNN+LSTM classifier. The motivation for using these baselines stems from their prevalence in AV image processing tasks, such as risk assessment. Users can easily use other graph/deep-learning models with the framework as long as their model follows the same, typical PyTorch™ model structure.

To enable live monitoring of training runs and in-depth analysis of the effects of different hyperparameter settings on performance, the library is integrated with Weights and Biases (W&B), W&B is a free, publicly available tool for tracking experiments, visualizing performance, identifying hyperparameter importance, and organizing results. This integration may enable researchers to identify trends in the data and optimize model performance more quickly.

For converting an image dataset into a set of scene-graph embeddings, the image is first preprocessed by the preprocessor to set the dataset format and image sizing. Next, the extractor extracts the scene-graph from the image. These scene-graphs can then be visualized using the visualizer tool.

These scripts take configuration information directly from the data_config and scene_araph_config files in the config module. The config files indicate which type of dataset is being used (CARLA or image-based) as well as the location and extraction settings for the dataset. The scene graph config file also allows the reconfiguration of the relation extraction settings as shown in FIG. 10. The choice of relation extraction settings changes the scene-graph structure, which can change how the graph learning model processes the data.

In prior AV research, attempts to improve vehicle safety have involved modeling either the objective risk or the subjective risk of driving scenes. The objective risk is defined as the objective probability of an accident occurring and is typically determined by statistical analysis. In contrast, subjective risk refers to the driver's own perceived risk and is an output of the driver's cognitive process. Since subjective risk accounts for the human behavior perspective and its critical role in anticipating risks, it has the potential to assess contextual risk better than objective methods and thus better assures passenger safety. Further, studies provide direct evidence that a driver's subjective risk assessment is inversely related to the risk of traffic accidents. Within this context, AVs must be able to understand driving scenes and quantify the subjective risk of driving decisions.

Given this motivation, the graph learning models available in roadscene2vec can be used to convert these extracted scene-graphs into spatlo-temporal scene-graph embeddings for the task of subjective risk assessment.

The assumption that the set of driving sequences can be partitioned into two jointly exhaustive and mutually exclusive subsets: risky and safe. The sequence of images of length T is denoted by $I=\{I_1, I_2, I_3, \ldots, I_T\}$. The present invention assumes the existence of a spatia-temporal function f that outputs whether a sequence of driving actions x is safe or risky via a risk label y, as given in the following equation.

$$y=f(I)=f(\{l_1,l_2,l_3,\ldots,l_{T-1},l_T\})$$

where y=(1, 0), if the driving sequence is safe y=(0, 1), if the driving sequence is risky Overall, the goal of the model is to learn to approximate the function f. To achieve this goal, the graph learning model is trained using the extracted sequences of scene-graphs as inputs and the subjective risk labels given by human annotators for each sequence. As such, the problem becomes a simple sequence classification problem, where the goal is to classify a given sequence of images as "risky" or "safe". The configuration settings for training the model are available in the learning config file in the config module.

In a third use case, roadscene2vec can be used to study approaches for predicting future vehicle collisions. In contrast to a sequence classification problem, collision prediction has safety-critical time constraints and uses the history of prior scene-graphs to make predictions about the state of future graphs. Current statistics indicate that perception and prediction errors were factors in over 40% of driver-related crashes between conventional vehicles. However, a significant number of reported AV collisions are also the result of these errors. With this motivation, scene-graphs can be used to represent road scenes and model inter-object relationships to improve perception and scene understanding.

The problem of collision prediction is formulated as a time-series classification problem where the goal is to predict if a collision will occur in the near future. The goal is to accurately model the spatia-temporal function $f$, where $$Y_n=f(\{I_1,\ldots,I_{n-1},I_n\}), Y_n\in\{0,1\}, \text{ for } n>2$$

where $Y_n=1$ implies a collision in the near future and $Y_n=0$ otherwise. Here the variable $I_n$ denotes the image captured by the on-board camera at time n. The interval between each frame varies with the camera sampling rate.

To train a model for this application, the model is adjusted to produce one output per graph instead of one output per sequence. For the application of collision prediction, each frame in a video clip is assigned a label identical to the entire clip's label to train the model to identify the preconditions of a future collision and predict it as early as possible.

Models trained on simulated datasets must be able to transfer their knowledge to real-world driving scenarios as they can differ significantly from simulations. One key advantage of using scene-graphs is that they are a form of Intermediate Representation (IR), meaning that they provide a higher level of abstraction compared to image data alone. This abstraction means that scene-graphs are generally better able to transfer knowledge across datasets and domains, such as from simulated data to real-world driving data. Since this is a key benefit of using a graph-based approach and is a critical use case for validating AV safety, roadscene2vec supports running transfer learning experiments between any two datasets, To implement this use case, the original dataset is used to train the model and use the user-specified transfer dataset to test the model. No additional domain adaptation is performed.

Explainability refers to the ability of a model to communicate the factors that influenced its decision-making process for a given input, particularly those that might lead the model to make incorrect decisions. Since deep-learning models are typically black-boxes, they are difficult to diagnose and adjust when failures occur. Thus, models which can better explain their decision-making process are easier to verify, debug, and make safer. The library enables users to analyze the explainability of different model architectures by visualizing the node attention scores of a graph learning model for a given input. First, using a pre-trained graph learning model, inference is run on a dataset and record the model's spatial and temporal attention scores for each sequence to a CSV file. The node attention scores are visualized for each scene-graph and the nodes are color-coded according to their attention score. For a given graph, the nodes with higher attention scores had a more significant impact on the decision made by the model.

The following is an additional embodiment of the present invention. In SG2VEC, the problem of collision prediction is formulated as a time-series classification problem where the goal is to predict if a collision will occur in the near future. The goal is to accurately model the spatia-temporal function f, where $$Y_n=f(\{I_1,\ldots,I_{n-1},I_n\}), Y_n\in[0,1], \text{ for } n>2$$

where $Y_n=1$ implies a collision in the near future and $Y_n=0$ otherwise. Here the variable In denotes the image captured by the on-board camera at time n. The interval between each frame varies with the camera sampling rate. SG2VEC consists of two parts (FIG. 6): (i) the scene-graph extraction, and (ii) collision prediction through spatia-temporal embedding.

The first step of the methodology is the extraction of scene-graphs for the images of a driving scene. The extraction pipeline forms the scene-graph for an image as in by first detecting the objects in the image and then identifying their relations based on their attributes. The difference from prior works lies in the construction of a scene-graph that is designed for higher-level AV decisions. A minimal set of relations is extracted such as directional relations and proximity relations. From design space exploration, adding many relation edges to the scene-graph adds noise and impacts convergence while using too few relation types reduces the model's expressivity. The best approach involves constructing mostly ego-centric relations for a moderate range of relation types. FIG. 3 shows an example of the graph extraction process.

The extracted scene-graph is denoted for the frame $I_n$ by $G_n=\{O_n, A_n\}$. Each scene-graph $G_n$ is a directed, heterogeneous multi-graph, where $O_n$ denotes the nodes and $A_n$ is the adjacency matrix of the graph $G_n$. As shown in FIG. 3, nodes represent the identified objects such as lanes, roads, traffic signs, vehicles, pedestrians, etc., in a traffic scene. The adjacency matrix $A_n$ indicates the pairwise relations between each object in $O_n$. The extraction pipeline first identifies the objects $O_n$ by using Mask R-CNN. Then, it generates an inverse perspective mapping (also known as a "birds-eye view" projection) of the image to estimate the locations of objects relative to the ego car, which are used to construct the pairwise relations between objects in $A_n$. For each camera angle, the birds-eye view projection settings is calibrated using known fixed distances, such as the lane length and width, as defined by the highway code. This enables the estimation of longitudinal and lateral distances accurately in the projection. For datasets captured by a single vehicle, this step only needs to be performed once. However, for datasets with a wide range of camera angles such as the 620-dash dataset introduced later in the paper, this process needs to be performed once per vehicle. With a human operator, this calibration step takes approximately 1 minute per camera angle on average.

The extraction pipeline identifies three kinds of pairwise relations: proximity relations (e.g. visible, near, very near, etc.), directional (e.g. Front Left, Rear Right, etc.) relations, and belonging (e.g. car 1 isIn left lane) relations. Two objects are assigned the proximity relation, r {Near Collision (4 ft.), Super Near (7 ft.), Very Near (10 ft.), Near (16 ft.), Visible (25 ft.)} provided the objects are physically separated by a distance that is within that relation's threshold. The directional relation, r e {Front Left, Left Front, Left Rear, Rear Left, Rear Right, Right Rear, Right Front, Front Right}, is assigned to a pair of objects, in this case between the ego-car and another car in the view, based on their relative orientation and only if they are within the Near threshold distance from one another. Additionally, the isIn relation identifies which vehicles are on which lanes (see FIG. 3). Each vehicle's horizontal displacement is used relative to the ego vehicle to assign vehicles to either the Left Lane, Middle Lane, or Right Lane using the known lane width. The abstraction only considers three-lane areas, and, as such, vehicles in all left lanes and all right lanes are mapped to the same Left Lane node and Right Lane node respectively. If a vehicle overlaps two lanes (i.e., during a lane change), it is mapped to both lanes.

As shown in FIG. 6, in collision prediction methodology, each image In is first converted into a scene-graph $G_n=\{O_n, A_n\}$. Each node $v \in O_n$ is initialized by a one-hot vector (embedding), denoted by $h_v^{(0)}$. Then, the MR-GCN layers are used to update these embeddings via the edges in $A_n$. Specifically, the l-th MR-GCN layer computes the node embedding for each node v, denoted as $h_v^{(l)}$, as follows:

$$h_v^{(l)} = \Phi_0 \cdot h_v^{(l-1)} + \sum_{r \in A_n} \sum_{u \in N_r(v)} \frac{1}{|N_r(v)|} \Phi_r \cdot h_u^{(l-1)}$$

where $N_r(v)$ denotes the set of neighbors of node v with respect to the relation $r \in A_n$, $\Phi_r$ is a trainable relation-specific transformation for relation r, and $\Phi_0$ is the self-connection for each node v that accounts for the influence of $h_v^{(l-1)}$ on $h_v^{(l)}$. After multiple MR-GCN layers, the output of each layer is concatenated to produce the final embedding for each node, denoted by $H_v^L=\text{CONCAT}(\{h_v^{(l)}\}|l=0, 1, \ldots, L)$, where L is the index of the last layer.

The final embeddings for scene-graph $G_n$ denoted by $X_n^{prop}$, are then passed through a self-attention graph pooling (SAGPooling) layer that filters out irrelevant nodes from the graph, creating the pooled set of node embeddings $X_n^{pool}$ and their edges $A_n^{pool}$. In this layer, a graph convolution layer is used to predict the score $\alpha=\text{SCORE}(X_n^{prop}, A_n^{prop})$ and then use a to perform top-k filtering to filter out the irrelevant nodes in the scene-graph.

Then, for each scene-graph $G_n$ the corresponding $X_n^{pool}$ is passed through the graph readout layer that condenses the node embeddings (using operations such as sum, mean, max, etc.) to a single graph embedding $h_{G_n}$ Then, this spatial embedding $h_{G_n}$ is passed to the temporal model (LSTM) to generate a spatio-temporal embedding $z_n$ as follows:

$$z_n \cdot s_n = \text{LSTM}(h_{G_n} \cdot s_{n-1})$$

The hidden state $s_n$ of the LSTM is updated for each timestamp n. Lastly, each spatio-temporal embedding $z_n$ is then passed through a Multi-Layer Perceptron (MLP) that outputs each class's confidence value. The two outputs of the MLP are compared, and $\hat{Y}_n$ is set to the index of the class with the greater confidence value (0 for no-collision or 1 for collision). During training, the cross-entropy loss is calculated between each set of non-binarized outputs $\hat{Y}_n$ and the corresponding labels for backpropagation.

EXAMPLE

The following is a non-limiting example of the present invention. It is to be understood that said example is not intended to limit the present invention in any way. Equivalents or substitutes are within the scope of the present invention.

Two types of datasets were prepared for experimentation: (i) real-world driving datasets and (ii) synthesized datasets.

The real-world dataset was generated by extracting lane change clips from the Honda® Driving Dataset (HDD). To create the synthesized datasets, a tool was developed to generate lane changing clips using the Carla and Carla Scenario Runner.

Carla is an open-source driving simulator that allows users to control a vehicle in either manual mode or autopilot mode. The Carla Scenario Runner contains a set of atomic controllers that enable users to control a car in a driving scene and perform complex driving maneuvers. The user script in Carla was modified so that it could (i) select one autonomous car randomly and switch its mode to manual mode, and then (ii) utilize Scenario Runners function to force the vehicle to change lanes.

The data generating tool allowed the fabrication of lane changing clips directly instead of extracting them from long driving clips. A wide range of simulated lane changes were generated using the various presets in Carla that allowed experimenters to specify the number of cars, pedestrians, weather and lighting conditions, etc. Also, through the APIs provided by the Traffic Manager (TM) of the Carla simulator, the driving characteristics of every autonomous vehicle were customized, such as the intended speed considering the current speed limit, the chance of ignoring the traffic lights, or the chance of neglecting collisions with other vehicles. Overall, this allowed the simulation of a wide range of very realistic urban driving environments and the generation of synthesized datasets suitable for training and testing a model.

To label the lane change clips in both the real-world and synthesized datasets, an annotation process was performed. First, in this process, human annotators were asked to assign a risk score to each clip that ranges from −2 and 2, where 2 implies a highly risky lance change and −2 means the safest lane change. Then, for each lane change clip, all the risk labels of annotators were averaged and converted to the binary label y as follows: if the average is 0, then assign y=0 (safe); else assign y=1 (risky).

Two synthesized datasets were generated: a 271-syn dataset and a 1043-syn dataset, containing 271 and 1,043 lane-changing clips, respectively. In addition, the 271-syn and 1043-syn datasets were sub-sampled further to create two balanced datasets that have a 1:1 distribution of risky to safe lane changes: 96-syn and 306-syn. The real-driving dataset was called 571-honda as it contains 571 lane-changing video clips.

Each dataset was randomly split into a training set and a testing set by the ratio 7:3 such that the split was stratified, i.e., the proportion of risky to safe lane change clips in each of the splits was the same. The models were evaluated on a dataset by training on the training set and evaluating their performance on the testing set. The final score of a model on a dataset was computed by averaging over the testing set scores for ten different stratified train-test splits of the dataset.

The models were implemented using PyTorch™ and PyTorch™ Geometric. The ADAM optimizer was used for the training algorithm. Three learning rates were considered: 0.0005, 0.0001, 0.00005), and a weight decaying rate of 5×10-4 per epoch. A batch size of 16 sequences was used for each training epoch. In experiments, each model was trained for 200 epochs. To ensure a fair comparison between the present model and the baseline model, the model's performance with the lowest validation loss was reported throughout the training for scoring.

All the experiments were conducted on a server with one NVIDIA® TITAN-XP graphics card and one NVIDIA®

GeForce GTX 1080 graphics card. For implementing the baseline model, the source code available at their open-source repository was used.

Each model's performance was evaluated by measuring its classification accuracy and the Area Under the Curve (AUC) of the Receiver Operating Characteristic (ROC) for each dataset. The classification accuracy is the ratio of the number of correct predictions on the test set of a dataset to the total number of samples in the testing set. AUC, sometimes referred to as a balanced accuracy measure, measures the probability that a binary classifier ranks a positive sample more highly than a random negative sample. This was a more balanced measure for measuring accuracy, especially with imbalanced datasets (i.e. 271-syn, 1043-syn, 571-honda).

From experimentation, it was found that the best option for the hyper-parameters of the model is a mini-batch size of 16 sequences, a learning rate of 0.00005, two MR-GCN layers with 100 hidden units, a SAGPool pooling layer with a ratio of 0.5, sum-pooling for graph readout operation and LSTM-attn for temporal modeling.

FIGS. 13A-13B shows the comparison between the present model's performance and the baseline model for all the synthetic datasets. The results show that the aforementioned approach consistently outperformed across all the datasets in terms of both classification accuracy and AUC. Particularly, on the 1043-syn dataset, the Image-based and GT pipelines of the present invention outperform in classification accuracy by 4.4% and 5% respectively (i.e., an accuracy of 95.8% and 96.4% compared to 91.4% for the baseline).

It was found that the performance difference between the present approach and the baseline increased when the training datasets were smaller. FIGS. 13A-13B shows that the difference in the accuracy between the present approach using the GT pipeline and the baseline is 5% for the 1043-syn dataset and 8.7% for the 271-syn dataset. This indicates that the present approach learned an accurate model even from a smaller dataset. This was a direct result of its use of a scene-graph based IR.

It was also found that the present approach performed better than the baseline on balanced datasets. Among the datasets used for evaluation of the models, the datasets 271-syn and 306-syn contained roughly the same number of clips but differed in the distribution of safe to risky lane changes (2.30:1 for 271-syn vs. 1:1 for 306-syn). The performance difference between the present image-based approach and the baseline on these datasets was 12.9% on the 306-syn dataset compared to 7.8% on the 271-syn dataset, indicating that the present approach could discriminate between the two classes better than the baseline.

The contribution of each functional component was evaluated in the proposed model by conducting an ablation study. The results of the study are shown in FIG. 13O. From FIG. 13O, it was found that the simplest of the models, with no MR-GCN layer (replaced with an MLP layer) and a simple average of the embeddings in hl for the temporal model (denoted as mean in FIG. 13C), achieved a classification accuracy of 75%. It was found that replacing mean with an LSTM layer for temporal modeling yielded a 10.5% increase in performance. It was also found that including a single MR-GCN with 64 hidden units and sum-pooling to the simplest model results in 14.8% performance gain over the simplest model. The performance gain achieved just by including the MR-GCN layer clearly suggested the effectiveness of modeling the relations between the objects. Finally, it was found that the model with one MR-GCN with 64 hidden units and sum-pooling plus the LSTM layer for temporal modeling yielded the maximum gain of 18.1% over the simplest model.

For evaluating the benefits of graph attention, an attention-free model was implemented: one MR-GCN layer with sum-pooling+mean. In comparison, the model that used SAGPool for attention on the graph shows a 2.7% performance gain over the attention-free model. This indicated that the use of attention over both nodes and relations allowed SAGPool to better filter out irrelevant nodes from each scene-graph. It was found that the model using TopkPool as the graph-attention layer became relatively unstable, resulting in a 2.4% performance drop compared to the attention-free model. This can be because TopkPool ignored the relations of a node when calculating a. Another reason for this instability could have been the random initialization of weights in TopkPool, which can exponentially affect the overall performance.

For evaluating the impact of attention on the temporal model, the effects of adding a temporal attention layer to the following two models were evaluated: 0) with no MR-GCN layers and no temporal attention and (ii) with one MR-GCN layer and no temporal attention. Compared to the model with no MR-GCN layer and no temporal attention, the performance of the model with no MR-GCN and LSTM-attn was found to be 0.1% higher. It was also found that adding LSTM-attn to the model with one MR-GCN layer increases its performance by 0.7% over the same model with no temporal attention. These results demonstrated that the inclusion of temporal attention does improve the performance, though only marginally. The reason why only a marginal improvement was seen may be that the temporal attention layer is less relevant with the dataset that the model was trained on. When preparing these datasets, the frames that are irrelevant to a lane change were manually removed, exactly the set of frames that temporal attention would have given less attention to, thus minimizing its effect.

The primary benefit of using the graph-attention and the temporal attention was that it improved the explainability of the model's risk assessment. Intuitively, the frame with a higher attention score at contributed more to the context vector c, thus playing a more critical role in calculating $h_{G_t}$ and contributing to the final risk assessment decision. In this risky lane changing example, the temporal attention scores progressively increased between frames 19 and 32 during the lane change; and the highest frame attention weights appeared in frames 33 and 34, which were the frames immediately before the collision occurs. A higher score for a node indicated that it contributed more to the final decision of risk assessment. As shown in this example, as the ego car approached the yellow vehicle, the node attention weights for the ego car and the yellow vehicle were increased proportionally to the scene's overall risk. In the first few frames, the risk of collision is low; thus the node attention weights are low; however, in the last few frames, a collision between these two vehicles are imminent; thus the attention weights for the two cars were much higher than for any other nodes in the graph. This example clearly demonstrates the present model's capability to pinpoint the critical factors in a scene-graph that contributed to its risk assessment decision. This capability was valuable for debugging edge cases at design time, thus reducing the chances of ADS making unexpected, erroneous decisions in real-world scenarios and improving human trust in the system.

The present approach's capability to effectively transfer the knowledge learned from a simulated dataset to a real-world dataset was demonstrated. To demonstrate this capability, the model weights and parameters learned from training on the 271-syn dataset or the 1043-syn dataset directly for testing on the real-world driving dataset: 571-honda were used. The transferability of the present model was compared with that of the baseline method. The results are shown in FIG. 13D.

As expected, the performance of both the present approach and the baseline degraded when tested on the 571-honda dataset. However, as FIG. 13D shows, the accuracy of the approach only dropped by 6.7% and 3.5% when the model was trained on 271-syn and 1043-syn, respectively, while the baseline's performance dropped drastically by a much higher 21.3% and 14.9%, respectively. The results categorically show that the proposed model transferred knowledge more effectively than the baseline.

Subjective risk assessment is a challenging, safety-critical problem that requires a good semantic understanding of many possible road scenarios. The results show that the scene-graph augmented approach outperformed state-of-the-art techniques at risk assessment tasks in terms of accuracy (95.8% vs. 91.4%) and AUC (0.978 vs. 0.958). It was also shown that the present approach can learn with much less training data than these techniques, as the present approach achieved 91.8% accuracy on the 96-syn dataset compared to 78.2% accuracy achieved by prior systems. Additionally, the results show that the present approach could better transfer knowledge gained from simulated datasets to real-world datasets (5.0% avg. acc. drop for the approach vs. 18.1% avg. acc. drop). It was also shown that the spatial and temporal attention components used in the present approach improved both its performance and its explainability.

For experiments, two types of driving datasets were prepared: (i) synthesized lane-changing datasets (271-syn and 1043-syn), and (ii) typical real-world driving datasets (571-honda and 1361-honda). All of the datasets were labeled using the annotator tool. Each dataset was randomly split into a training set and a testing set by the ratio 7:3 such that the split was stratified, i.e., the proportion of risky to safe lane change clips in the training and testing sets was the same. The models were first trained on the training set before being evaluated on the testing set. The final score of a model on a dataset was computed by averaging over the testing set scores for five different stratified train-test splits.

Two graph learning architectures were used, denoted MRGCN and MRGIN. Both models consisted of the following structure: two graph convolution layers of size 64, one SAG Dooling layer with 0.5 pooling ratio, one add readout layer, and one problem-specific temporal model as defined in FIG. 12. The two architectures only differed in the way successive graph convolutions are processed. As for the baselines, the ResNet-50 CNN classifier and the CNN+LSTM classifier were evaluated. All models were evaluated using 5-fold cross-validation with the average test performance over the five folds presented as the final result. A demonstration of the visualizer tool is shown in FIG. 8. As shown, the visualizer allowed the user to inspect how objects detected in the input image translate to the objects and relations in the scene-graph.

roadscene2vec was used to train and evaluate several models for the subjective risk assessment use case. Classification accuracy and the Area Under the Curve (AUC) of the Receiver Operating Characteristic (ROC) were used to score the models, AUC, sometimes referred to as a balanced accuracy measure, measured the probability that a binary classifier ranked a positive sample more highly than a random negative sample. This was a more balanced measure for measuring accuracy, especially with imbalanced datasets (i.e., 271-syn, 1043-syn, 571-honda).

FIG. 16A shows a comparison between MRGCN, MRGIN, ResNet-50, and CNN+LSTM models for driving scene risk assessment. The results show that the MRGCN based approach consistently outperformed the other models across all the datasets in terms of both classification accuracy and AUC. The performance difference between the scene-graph based approaches and the CNN-based approaches increased when the training datasets were smaller, indicating that the graph-based methods could likely learn a good representation with fewer data.

The models in roadscene2vec were evaluated at collision prediction using classification accuracy, AUC, and Matthews Correlation Coefficient (MCC). MCC was considered a balanced performance measure for binary classification, even on datasets with significant class imbalances. The MCC score outputs a value between −1.0 and 1.0, where 1.0 corresponds to a perfect classifier, 0.0 to a random classifier, and −1.0 to an always incorrect classifier. The results from the evaluation are shown in FIG. 16B.

Once again, MRGCN outperformed the other models on the synthetic datasets. However, on the 571-honda dataset, the ResNet-50 model outperformed MRGCN across all metrics. Upon deeper inspection of the results, the ResNet-50 model had a higher FNR than the MRGCN and a lower FPR than the MRGCN, suggesting that the ResNet-50 model was less sensitive than the MRGCN. Given that collision prediction is a safety-critical application, this behavior may not necessarily be desirable; however, decision boundary tuning could be used to fine-tune the sensitivity for the final application's requirements.

On both Use Case 2 and 3, MRGIN underperforms MRGCN, likely because MRGCN was a more general framework while MRGIN was designed to perform well at graph topology analysis problems, such as graph isomorphism testing. roadscene2vec was used to evaluate each model's ability to transfer the knowledge learned from simulated datasets to real-world datasets. As part of this use case, roadscene2vec used the model weights and parameters learned from training on the simulated dataset (271-syn or 1043-syn in this case) directly for testing on the real-world driving dataset (571-honda) with no domain adaptation steps. FIG. 16O shows the results of this evaluation for the MRGCN, ResNet-50, and CNN+LSTM models.

As expected, the performance of all models degraded when tested on the 571-honda dataset. However, as shown in FIG. 16C, the accuracy of the MRGCN only dropped by 3.5% and 6.5% when the model was trained on 271-syn and 1043-syn, respectively, while the CNN+LSTM's performance dropped by 27.9% and 17.3%, respectively. Furthermore, the MRGCN achieved a higher accuracy score than the CNN+LSTM when transferring from the smaller 271-syn dataset, once again indicating that scene-graph models better model the problem even when trained on smaller amounts of data. The ResNet-50 model performed worst and classified most of the sequences as risky, resulting in an accuracy score nearly equivalent to the proportion of risky sequences in the 571-honda dataset (17.25%). These results suggested that the scene-graph models transferred knowledge more effectively than the CNN-based models.

To demonstrate roadscene2vec's tools for evaluating explainability, an included explainability analysis tool on the MRGCN model trained for risk assessment was used on the 271-syn dataset. The attention scores were highest on the nodes which presented the highest degree of risk. Additionally, the graph with the highest attention score for the other vehicle was also the graph corresponding to the collision with the other vehicle.

Although roadscene2vec was intended to be a tool that benefits the research community, its practicality and carry-over to real-world applications were equally important. roadscene2vec enabled researchers to directly evaluate the ability of models trained on synthetic data to transfer their knowledge to real-world driving scenes. Many research papers often overlooked this critical problem, leading to a disconnect between simulated trials and real-world performance. The present tool better enabled the study of this crucial problem area and allowed researchers to analyze the real-world practicality of various graph-based methodologies. Furthermore, roadscene2vec was directly compatible with both the real-world Honda® driving dataset as well as the popular open-source driving simulator, CARLA, making the present tool useful for a wide range of potential AV applications.

The following is another example of the presently claimed invention. For SG2VEC, 2 MR-GCN layers were used, each of size 64, one SAGPooling layer with a pooling ratio of 0.25, one add-readout layer, one LSTM layer with hidden size 20, one MLP layer with an output of size 2, and a LogSoftmax to generate the final confidence value for each class. For the DPM, one 64×64×5 Convolutional LSTM (ConvLSTM) layer, one 32×32×5 ConvLSTM layer, one 16×16×5 ConvLSTM layer, one MLP layer with output size 64, one MLP layer with output size 2, and a Softmax to generate the final confidence value were used. For both models, a dropout of 0.1 and ReLU activation was used. The learning rates were 0.00005 for SG2VEC and 0.0001 for DPM. Experiments were run on a Windows® PC with an AMDS Ryzen Threadripper 1950× processor, 16 GB RAM, and an Nvidia® GeForce RTX 2080 Super GPU.

Three types of datasets were performed for the experiments: (i) synthesized datasets, (ii) a typical real-world driving dataset, and (iii) a complex real-world driving dataset. Examples from each dataset are shown in FIG. 17. The synthetic datasets focused on the highway lane change scenario as it was a common AV task. To evaluate the transferability of each model from synthetic datasets to real-world driving, a typical real-world dataset was prepared containing lane-change driving clips. Finally, the complex real-world driving dataset was prepared to evaluate each model's performance on a challenging dataset containing a broad spectrum of collision types, road conditions, and vehicle maneuvers. All datasets were collected at a 1280×720 resolution, and each clip spans 1-5 seconds.

To synthesize the datasets, a tool was developed using CARLA, an open-source driving simulator, and CARLA Scenario Runner to generate lane change video clips with/without collisions. A wide range of simulated lane changes were generated with different numbers of cars, pedestrians, weather and lighting conditions, etc. Each vehicle's driving behavior was also customized, such as their intended speed, probability of ignoring traffic lights, or the chance of avoiding collisions with other vehicles. Two synthetic datasets: a 271-syn dataset and a 1043-syn dataset were generated, containing 271 and 1,043 video clips, respectively. These datasets have no-collision:collision label distributions of 6.12:1 and 7.91:1, respectively. In addition, the 1043-syn dataset was sub-sampled to create 306-syn: a balanced dataset that has a 1:1 distribution.

This dataset, denoted as 571-honda, was a subset of the Honda® Driving Dataset (HOD) containing 571 lane-change video clips from real-world driving with a distribution of 7.21:1. The HOD was recorded on the same vehicle during mostly safe driving in the California Bay Area. The complex real-world driving dataset, denoted as 620-dash, contained very challenging real-world collision scenarios drawn from the Detection of Traffic Anomaly dataset. This dataset contained a wide range of drivers, car models, driving maneuvers, weather/road conditions, and collision types, as recorded by on-board dashboard cameras. Since the original dataset contained only collision clips, 620-dash was prepared by splitting each clip in the original dataset into two parts: (i) the beginning of the clip until 1 second before the collision, and (ii) from 1 second before the collision until the end of the collision. Part (i) was labeled as 'no-collision' and part (ii) as 'collision.' The 620-dash dataset contained 315 collision video clips and 342 non-collision driving clips.

The synthetic datasets and the 571-honda dataset were labeled using human annotators. The final label assigned to a clip was the average of the labels assigned by the human annotators rounded to 0 (no collision) and 1 (collision/near collision). Each frame in a video clip was given a label identical to the entire clip's label to train the model to identify the preconditions of a future collision. For SG2VEC, all the datasets were pre-processed using the scene-graph extraction pipeline to construct the scene-graphs for each video clip. For a given sequence, SG2VEC leveraged the full history of prior frames for each new prediction. For the DPM, the datasets were pre-processed to match the input format used in its original implementation. Thus, the DPM used 64×64 grayscale versions of the clips in the datasets turned into sets of sub-sequences $J_n$ for a clip of length l defined as follows.

$$J_n = \{I_n, I_{n+1}, I_{n+2}, I_{n+3}, I_{n+4}\}, \text{ for } n \in [1, l-4]$$

Since DPM only uses five prior frames to make each prediction, results for SG2VEC were prevented using the same length of history, denoted as SG2VEC (5-frames) in the results.

SG2VEC and the DPM were evaluated using classification accuracy, area under the ROC curve (AUC), and Matthews Correlation Coefficient (MCC). MCC was considered a balanced measure of performance for binary classification even on datasets with significant class imbalances. The MCC score outputted a value between −1.0 and 1.0, where 1.0 corresponded to a perfect classifier, 0.0 to a random classifier, and −1.0 to an always incorrect classifier. Although class re-weighting helped compensate for the dataset imbalance during training, classification accuracy was typically less reliable for imbalanced datasets, so the primary metric used to compare the models is MCC. Stratified 5-fold cross-validation was used to produce the final results shown in FIG. 15A and FIG. 15D.

The performance of SG2VEC and the DPM on the synthetic datasets is shown in FIG. 15A. It was found that SG2VEC achieved higher accuracy, AUC, and MCC on every dataset, even when only using five prior frames as input. $I_n$ addition to predicting collisions more accurately, SG2VEC also inferred 5.5× faster than the DPM on average. This was attributed to the differences in model complexity between SG2VEC architecture and the much larger DPM model. Interestingly, SG2VEC (5-frames) achieved slightly better accuracy and AUC than SG2VEC on the imbalanced datasets and slightly lower overall performance on the balanced datasets. This was likely because the large number of safe lane changes in the imbalanced datasets added noise during training and made the full-history version of the model perform slightly worse. However, the full model learned long-tail patterns for collision scenarios and performed better on the balanced datasets.

The DPM achieved relatively high accuracy and AUC on the imbalanced 271-syn and 1043-syn datasets but suffered significantly on the balanced 306-syn dataset. This drop indicated that the DPM could not identify the minority class (collision) well and tended to over-predict the majority class (no-collision). $I_n$ terms of MCC, the DPM scores higher on the 306-syn dataset than what it scored on the other datasets. This result was because the 306-syn dataset had a balanced class distribution compared to the other datasets, which could enable the DPM to improve its prediction accuracy on the collision class.

$I_n$ contrast, the SG2VEC methodology performed well on both balanced and imbalanced synthetic datasets with an average MCC of 0.5860, an average accuracy of 87.97%, and an average AUC of 0.9369. Since MCC was scaled from −1.0 to 1.0, SG2VEC achieved a 14.72% higher average MCC score than the DPM model. The results from SG2VEC ablation study are shown in FIG. 15C and support the hypothesis that both spatial modeling with MRGCN and temporal modeling with LSTM were core to SG2VEC's collision prediction performance. However, the MRGCN appeared to be slightly more critical to performance than the LSTM. Interestingly the choice of pooling layer (no pooling, Top-K pooling, or SAG Pooling) did not seem to significantly affect performance at this task as long as LSTM is used; when no LSTM was used SAG Pooling presented a clear performance improvement.

The performance of both models significantly dropped on the highly complex real-world 620-dash dataset due to the variations in the driving scenes and collision scenarios. This drop was expected as this dataset contained a wide range of driving actions, road environments, and collision scenarios, increasing the difficulty of the problem significantly. Several steps were taken to try and address this performance drop. First, the birds-eye view (BEV) calibration was improved on this dataset in comparison to the other datasets. Since the varying camera angles and road conditions in this dataset impacted the ability to properly calibrate SG2VEC's BEV projection in a single step, custom BEV calibrations were created for each clip in the dataset, which improved performance somewhat. However, as shown in FIG. 17 (620-dash), a significant part of the dataset consisted of driving clips on roads without any discernible lane markings, such as snowy, unpaved, or unmarked roadways. These factors made it challenging to correlate known fixed distances (i.e., the width and length of lane markings) with the projections of these clips. To further improve performance on this particular dataset, extensive architecture and hyperparameter tuning were performed.

It was found that, with one MRGCN layer of size 64, one LSTM layer with hidden size 100, no SAGPooling layer, and a high learning rate and batch size, significantly better performance was achieved in comparison to the model architecture comprising 2 MRGCN layers of size 64, one LSTM layer with hidden size 20, and a SAGPooling layer with a keep ratio of 0.5. It was believed that this indicated that the temporal features of each clip in this dataset were more closely related to collision likelihood than the spatial features in each clip. As a result, the additional spatial modeling components were likely causing overfitting and skewing the spatial embedding output. The spatial embeddings remained more general with a simpler spatial model (1 MRGCN and no SAGPooling). This change, combined with using a larger LSTM layer, enabled the model to capture more temporal features when modeling each clip and better generalize to the testing set. Model performance on this dataset and similar datasets could likely be improved by acquiring more consistent data via higher-resolution cameras with fixed camera angles and more accurate BEV projection approaches. However, as collisions are rare events, there are little to no datasets containing real-world collisions that meet these requirements. Despite these limitations, SG2VEC outperformed the DPM model by a significant margin, achieving 21.17% higher accuracy, 31.40% higher AUC, and a 21.92% higher MCC score. Since DPM achieved a negative MCC score, its performance on this dataset is worse than that of a random classifier (MCC of 0.0). Consistent with the synthetic dataset results, sg2vec using all frames performed better on the balanced 620-dash dataset than SG2VEC (5-frames). Overall, these results show that, on very challenging and complex real-world driving scenarios, SG2VEC performed much better than the current state-of-the-art.

Since collision prediction is a time-sensitive problem, the methodology and the DPM were evaluated on their average time-of-prediction (ATP) for video clips containing collisions. To calculate the ATP, the first frame index was recorded in each collision clip when the model correctly predicted that a collision would occur. These indices were then averaged and compared with the average collision video clip length. Essentially, ATP gave an estimate of how early each model predicted a future collision. These results are shown in FIG. 15E. On the 1043-syn dataset, SG2VEC achieved 0.1725 for the ratio of the ATP and the average sequence length while the DPM achieved a ratio of 0.2382, indicating that SG2VEC predicted future collisions 39.07% earlier than the DPM on average. $I_n$ the context of real-world collision prediction, the average sequence in the 1043-syn dataset represented 1.867 seconds of data. Thus, the methodology predicted collisions 122.7 milliseconds earlier than DPM on average. This extra time can be critical for ensuring that the AV avoids an impending collision.

The collision prediction models trained on simulated datasets must be transferable to real-world driving as they can differ significantly from simulations. To evaluate each model's ability to transfer knowledge, each model was trained on a synthetic dataset before testing it on the 571-honda dataset. No additional domain adaptation was performed. Transferability to the 620-dash dataset was not evaluated because it contained a wide range of highly dynamic driving maneuvers that were not present in the synthesized datasets. As such, evaluating transferability between the synthesized datasets and the 620-dash dataset would yield poor performance and would not provide insight. FIG. 15D compares the accuracy and MCC for both the models on each training dataset and the 571-honda dataset after transferring the trained model.

It was observed that the SG2VEC model achieved a significantly higher MCC score than the DPM model after the transfer, suggesting that the methodology better transferred knowledge from a synthetic to a real-world dataset compared to the state-of-the-art DPM model. The drop in MCC values observed for both the models when transferred to the 571-honda dataset can be attributed to the characteristic differences between the simulated and real-world datasets; the 571-honda dataset contained a more heterogeneous set of road environments, lighting conditions, driving styles, etc., so a drop in performance after the transfer is expected. It is also noted that the MCC score for the SG2VEC model trained on the 271-syn dataset dropped more than the model trained on the 1043-syn dataset after the transfer, likely due to the smaller training dataset size, Regarding accuracy, the SG2VEC model trained on 1043-syn achieves 4.37% higher accuracy and the model trained 271-syn dataset achieved 1.47% lower accuracy than the DPM model trained on the same datasets. The DPM's similar accuracy after transfer likely resulted from the class imbalance in the 571-honda dataset. Overall, it was hypothesized that SG2VEC's use of an intermediate representation (i.e., scene-graphs) inherently improved its ability to generalize and thus resulted in an improved ability to transfer knowledge compared to CNN-based deep learning approaches.

To demonstrate that the SG2VEC is implementable on industry-standard AV hardware, its inference time (milliseconds), model size (kilobytes), power consumption (watts), and energy consumption per frame (milli-joules) were measured on the industry-standard Nvidia® DRIVE PX 2 platform, which was used by Tesla for their Autopilot system from 2016 to 2018. The hardware setup is shown in FIG. 14. For the inference time, the average inference time (AIT) was evaluated in milliseconds taken by each algorithm to process each frame. Power usage metrics were recorded using a power meter connected to the power supply of the PX 2. To ensure that the reported numbers only reflected each model's power consumption and not that of background processes, the hardware's idle power consumption was subtracted from the averages recorded during each test. For a fair comparison, the metrics for the core algorithm (i.e., the SG2VEC and DPM model) were captured, excluding the contribution from data loading and pre-processing. Both models were run with a batch size of 1 to emulate the real-world data stream where images are processed as they are received. For comparison, the AIT on a PC for the two models was shown.

The results are shown in FIG. 15E. SG2VEC performed inference 9.3× faster than the DPM on the PX 2 with an 88.0% smaller model and 32.4% less power, making it undoubtedly more practical for real-world deployment. The model also used 92.8% less energy to process each frame, which can be beneficial for electric vehicles with limited battery capacity. With an AIT of 0.4828 ms, SG2VEC can theoretically process up to 2,071 frames/second (fps). $I_n$ contrast, with an AIT of 4.535 ms, the DPM could only process up to 220 fps. $I_n$ the context of real-world collision prediction, this means that SG2VEC could easily support multiple 60 fps camera inputs from the AV while DPM would struggle to support more than three.

With the experiments, it was demonstrated that the scene-graph embedding methodology for collision prediction, SG2VEC, outperforms the state-of-the-art method, DPM, in terms of average MCC (0.5055 vs. 0.2096), average inference time (0.255 ms vs. 1.39 ms), and average time of prediction (39.07% sooner than DPM). Additionally, it was demonstrated that SG2VEC could transfer knowledge from synthetic datasets to real-world driving datasets more effectively than the DPM, achieving an average transfer MCC of 0,327 vs. 0,060. Finally, it was shown that the methodology performs faster inference than the DPM (0.4828 ms vs. 4.535 ms) with a smaller model size (331 KB vs. 2,764 KB) and reduced power consumption (2.99 W vs. 4.42 W) on the industry-standard Nvidia® DRIVE PX 2 autonomous driving platform. $I_n$ the context of real-world collision prediction, these results indicated that SG2VEC was a more practical choice for AV safety and could significantly improve consumer trust in AVs. Few works have explored graph-based solutions for other complex AV challenges such as localization, path planning, and control.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims. $I_n$ some embodiments, the figures presented in this patent application are drawn to scale, including the angles, ratios of dimensions, etc. $I_n$ some embodiments, the figures are representative only and the claims are not limited by the dimensions of the figures, $I_n$ some embodiments, descriptions of the inventions described herein using the phrase "comprising" includes embodiments that could be described as "consisting essentially of" or "consisting of", and as such the written description requirement for claiming one or more embodiments of the present invention using the phrase "consisting essentially of" or "consisting of" is met.

The reference numbers recited in the below claims are solely for ease of examination of this patent application, and are exemplary, and are not intended in any way to limit the scope of the claims to the particular features having the corresponding reference numbers in the drawings.

What is claimed is:

1. A computing system (100) implemented into an autonomous vehicle for generating one or more scene-graphs based on one or more images and calculating a probability of collision based on the one or more scene-graphs, the system (100) comprising:
   a. a processor (110) capable of executing computer-readable instructions; and
   b. a memory component (120) communicatively coupled to the display component and the processor (110), the memory component (120) comprising:
   i. a data generation module (121) comprising computer-readable instructions for:
      A. accepting the one or more images;
      B. identifying one or more objects in each image;
      C. identifying an ego-object in each image; and
      D. extracting the one or more objects and the ego-object from the one or more images as an object dataset for each image;
   ii. a scene-graph extraction module (122) comprising computer-readable instructions for:
      A. calculating a bounding box for each object of each object dataset;
      B. computing an inverse-perspective mapping transformation of the image to generate a bird's-eye view (BEV) representation of each image;
      C. projecting the one or more bounding boxes onto the BEV representation of each corresponding image;
      D. estimating a position of the one or more objects relative to the ego-object based on the one or more bounding boxes of each BEV representation;
      E. identifying a proximity relation between the ego-object and each object of the object dataset for each image by measuring a distance between the ego-object and each object;
      F. identifying a directional relation between the ego-object and each object of the object dataset for each image by determining a relative orientation of the ego-object and each object; and
      G. generating a scene-graph for each image based on the BEV representation, the one or more proximity relations, the one or more directional relations, and the one or more belonging relations;
         wherein each scene-graph comprises one or more nodes representing the corresponding ego-object and the corresponding object dataset; and iii. a collision prediction module (123) comprising computer-readable instructions for:
   A. embedding each node of each scene-graph through use of a machine learning model;
   B. assigning each node a score based on a potential for collision with the ego-object;
   C. condensing the one or more scene-graphs into a spatial graph embedding;
   D. generating a spatio-temporal graph embedding from the spatial graph embedding through use of a sequence model;
   E. calculating a confidence value for whether or not a collision will occur; and
   F. actuating, based on the confidence value, the autonomous vehicle to execute an evasive maneuver such that the autonomous vehicle avoids the collision;
   wherein all modules of the memory component (120) are communicatively coupled to each other.

2. The system (100) of claim 1, wherein calculating the confidence value is carried out through a multi-layer perceptron.

3. The system (100) of claim 1, wherein the scene graph extraction module (122) further comprises computer-readable instructions for extracting a rotation, acceleration, and velocity for each object.

4. The system (100) of claim 1, wherein the memory component (120) further comprises a preprocessing module (124) comprising computer-readable instructions for resizing and recoloring each image of the one or more images before scene-graph extraction.

5. The system (100) of claim 1, wherein the memory component (120) further comprises a risk assessment module (125) comprising computer-readable instructions for:
   a. processing the spatio-temporal graph embedding through a temporal attention layer of the sequence model to generate a context vector;
   b. processing the context vector through a temporal decoder to generate a final spatio-temporal graph embedding; and
   c. calculating a confidence value for whether or not the one or more images contain a risky driving maneuver.

6. The system (100) of claim 1, wherein the machine learning model comprises a multi-relational graph convolutional network (MR-GCN), a multi-relational graph isomorphism network (MR-GIN), a multi-layer perceptron (MLP), or a convolutional neural network (CNN).

7. The system (100) of claim 1, wherein the scene-graph extraction module (122) further comprises computer-readable instructions for identifying a belonging relation between each object and a lane selected from a group consisting of a left lane, a middle lane, and a right lane by measuring a horizontal displacement of each object the object dataset relative to the ego-object for each image.

8. The system (100) of claim 1, wherein the collision prediction module (123) further comprises computer-readable instructions for filtering out any nodes determined to be irrelevant based on the score.

9. The system (100) of claim 1, wherein the memory component (120) further comprises:
   a. a preprocessing module (124) comprising computer-readable instructions for resizing and recoloring each image of the one or more images; and
   b. a risk assessment module (125) comprising computer-readable instructions for:
      i. processing the spatio-temporal graph embedding through a temporal attention layer of the sequence model to generate a context vector;
      ii. processing the context vector through a temporal decoder to generate a final spatio-temporal graph embedding; and
      iii. calculating a confidence value for whether or not the one or more images contain a risky driving maneuver;
   wherein the scene-graph extraction module (122) further comprises computer-readable instructions for identifying a belonging relation between each object and a lane selected from a group consisting of a left lane, a middle lane, and a right lane by measuring a horizontal displacement of each object of the object dataset relative to the ego-object for each image;
   wherein the collision prediction module (123) further comprises computer-readable instructions for filtering out any nodes determined to be irrelevant based on the score.

10. The system (100) of claim 9, wherein the scene graph extraction module (122) further comprises computer-readable instructions for extracting a rotation, acceleration, and velocity for each object.

11. The system (100) of claim 9, wherein the machine learning model comprises a multi-relational graph convolutional network (MR-GCN), a multi-relational graph isomorphism network (MR-GIN), a multi-layer perceptron (MLP), or a convolutional neural network (CNN).

12. The system (100) of claim 9, wherein the sequence model comprises a recurrent neural network (RNN), a long short-term memory (LSTM) network, a multi-layer perceptron (MLP), or a statistical method.

13. A computer-implemented method implemented on an autonomous vehicle for generating one or more scene-graphs based on one or more images and calculating a probability of collision based on the one or more scene-graphs, the method comprising:
   a. accepting the one or more images from an external source;
   b. identifying one or more objects in each image;
   c. identifying an ego-object in each image;
   d. extracting the one or more objects and the ego-object from the one or more images as an object dataset for each image;
   e. calculating a bounding box for each object of each object dataset;
   f. computing an inverse-perspective mapping transformation of the image to generate a bird's-eye view (BEV) representation of each image;
   g. projecting the one or more bounding boxes onto the BEV representation of each corresponding image;
   h. estimating a position of the one or more objects relative to the ego-object based on the one or more bounding boxes of each BEV representation;
   i. identifying a proximity relation between the ego-object and each object of the object dataset for each image by measuring a distance between the ego-object and each object;
   j. identifying a directional relation between the ego-object and each object of the object dataset for each image by determining a relative orientation of the ego-object and each object;
   k. generating a scene-graph for each image based on the BEV representation, the one or more proximity relations, the one or more directional relations, and the one or more belonging relations;

wherein each scene-graph comprises one or more nodes representing the corresponding ego-object and the corresponding object dataset;
l. Embedding each node of each scene-graph through use of a machine learning model;
m. assigning each node a score based on a potential for collision with the ego-object;
n. condensing the one or more scene-graphs into a spatial graph embedding;
o. generating a spatio-temporal graph embedding from the spatial graph embedding through use of a sequence model;
p. calculating a confidence value for whether or not a collision will occur; and
q. actuating, based on the confidence value, the autonomous vehicle to execute an evasive maneuver such that the autonomous vehicle avoids the collision.

14. The method of claim 13, wherein calculating the confidence value is carried out through a multi-layer perceptron.

15. The method of claim 13 further comprising extracting a rotation, acceleration, and velocity for each object.

16. The method of claim 13 further comprising resizing and recoloring each image of the one or more images before scene-graph extraction.

17. The method of claim 13 further comprising:
a. processing the spatio-temporal graph embedding through a temporal attention layer of the sequence model to generate a context vector;
b. processing the context vector through a temporal decoder to generate a final spatio-temporal graph embedding; and
c. calculating a confidence value for whether or not the one or more images contain a risky driving maneuver.

18. The method of claim 13, wherein the machine learning model comprises a multi-relational graph convolutional network (MR-GCN), a multi-relational graph isomorphism network (MR-GIN), a multi-layer perceptron (MLP), or a convolutional neural network (CNN).

19. The method of claim 13 further comprising identifying a belonging relation between each object and a lane selected from a group consisting of a left lane, a middle lane, and a right lane by measuring a horizontal displacement of each object the object dataset relative to the ego-object for each image.

20. The method of claim 13 further comprising filtering out any nodes determined to be irrelevant based on the score.

* * * * *